(12) United States Patent
Uemura et al.

(10) Patent No.: US 7,340,182 B2
(45) Date of Patent: Mar. 4, 2008

(54) MULTIPLEXER

(75) Inventors: Aritomo Uemura, Tokyo (JP); Seiji Kozaki, Tokyo (JP); Kazuo Kubo, Tokyo (JP); Hiroshi Ichibangase, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 684 days.

(21) Appl. No.: 10/471,732

(22) PCT Filed: Mar. 14, 2002

(86) PCT No.: PCT/JP02/02444

§ 371 (c)(1),
(2), (4) Date: Mar. 5, 2004

(87) PCT Pub. No.: WO02/078279

PCT Pub. Date: Oct. 3, 2002

(65) Prior Publication Data

US 2004/0131089 A1    Jul. 8, 2004

(30) Foreign Application Priority Data

Mar. 15, 2001    (JP) ............................. 2001-074990

(51) Int. Cl.
*H04B 10/12*    (2006.01)
(52) U.S. Cl. .................. 398/183; 398/188; 398/182
(58) Field of Classification Search ......... 398/182–201
See application file for complete search history.

(56) References Cited

U.S. PATENT DOCUMENTS

| | | |
|---|---|---|
| 5,543,952 A | 8/1996 | Yonenaga et al. |
| 6,445,476 B1 * | 9/2002 | Kahn et al. .................. 398/189 |
| 2001/0017724 A1 | 8/2001 | Miyamoto et al. |
| 2001/0019442 A1 | 9/2001 | Shikata et al. |

FOREIGN PATENT DOCUMENTS

| | | |
|---|---|---|
| JP | 8-139681 A | 5/1996 |
| JP | 10-178397 A | 6/1998 |
| JP | 11-122205 A | 4/1999 |
| JP | 2000-92001 A | 3/2000 |
| JP | 1 026 863 A | 8/2000 |
| JP | 2000-224244 A | 8/2000 |
| JP | 2001-244894 A | 9/2001 |
| JP | 2001-326609 A | 11/2001 |

OTHER PUBLICATIONS

Ito et al, The Institute of Electronics, Information and Communication Engineers, 1997, Communication 2, pp. 821-822.
Ono et al, Journal of Lightwave Technology, vol. 16, No. 5, 1998, pp. 788-797.
Lender, The Duobinary Technique for High-Speed Data Transmission, 1963, pp. 214-218.

* cited by examiner

*Primary Examiner*—Jason Chan
(74) *Attorney, Agent, or Firm*—Birch, Stewart, Kolasch & Birch, LLP

(57) ABSTRACT

A multiplexer includes an encoder. The encoder includes: flip-flop circuits that output two signals having a transmission rate of B/2 at a frequency of B/2, while holding signals of each signal; an adder that adds the respective signals output from the flip-flop circuits and outputs the added signal; and a delay unit that delays the signal output from the flip-flop circuit by the time of 1/B, with respect to the signal output from the flip-flop circuit, and outputs the signal delayed to the adder.

23 Claims, 20 Drawing Sheets

FIG.11
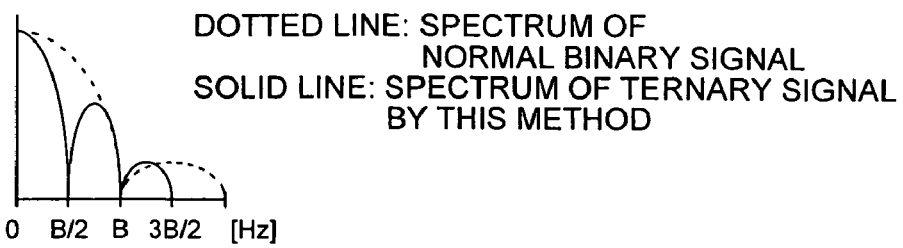
(a) ELECTRIC SPECTRUM OF ENCODER OUTPUT
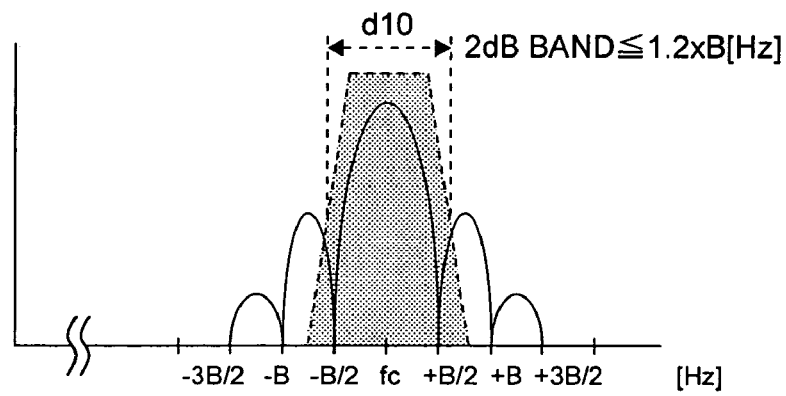
(b) OPTICAL SPECTRUM OF OPTICAL DUOBINARY SIGNAL
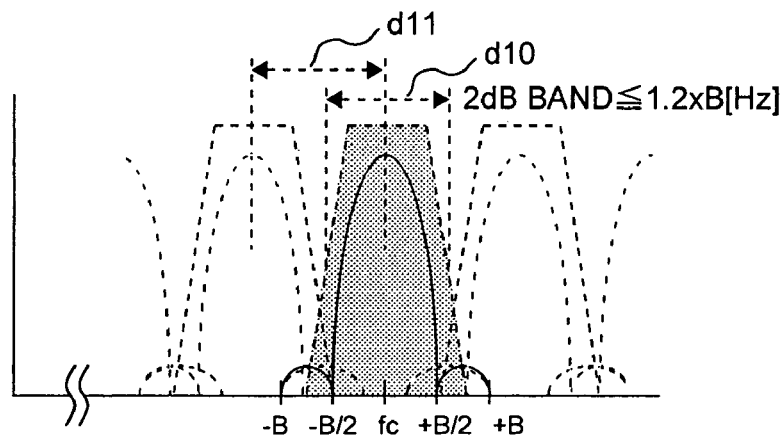
(c) OPTICAL SPECTRUM AFTER WAVELENGTH MULTIPLEXING
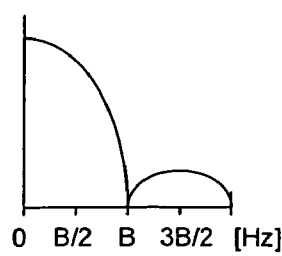
(d) ELECTRIC SPECTRUM AFTER SQUARE-LAW DETECTION BY DECODER (PD)

FIG.13
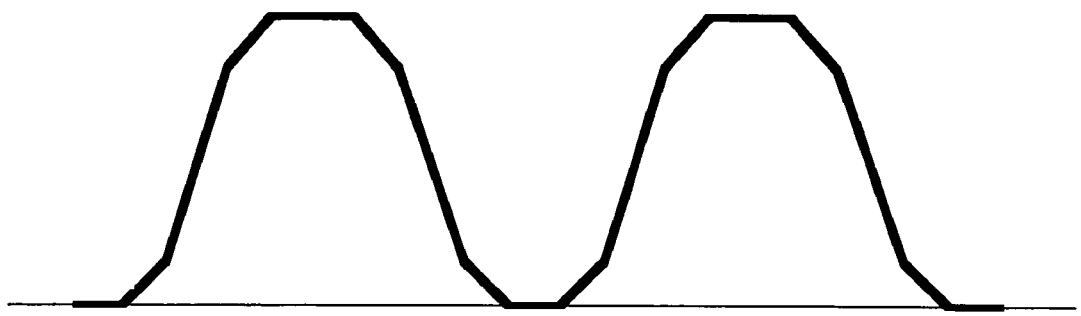
(a) EXAMPLE OF PULSE TIME WAVEFORM AT TRANSMISSION END
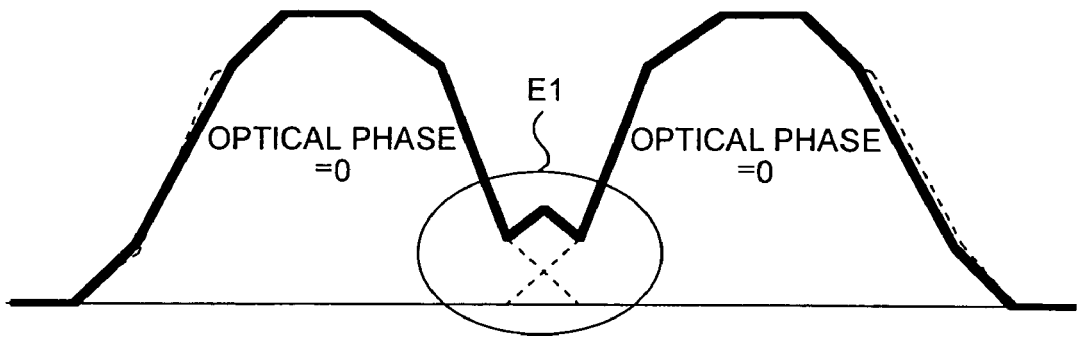
(b) EXAMPLE OF TIME WAVEFORM SPREAD BY TRANSMISSION DISTORTED PULSE
(WHEN OPTICAL PHASE OF PULSE IS CONTINUOUS)
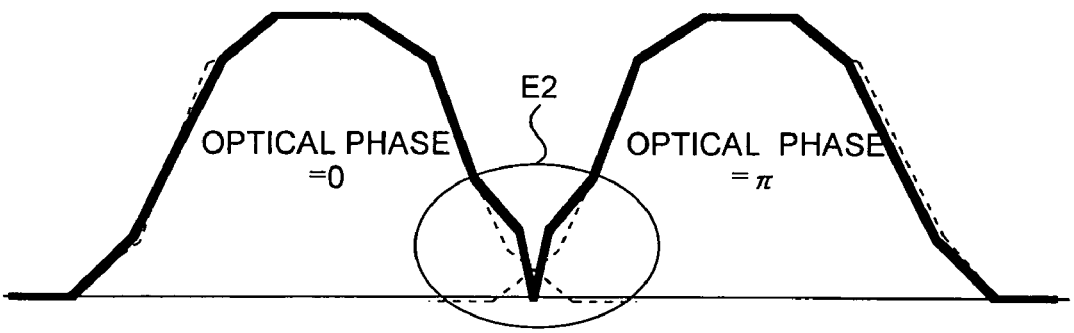
(c) EXAMPLE OF TIME WAVEFORM SPREAD BY TRANSMISSION DISTORTED PULSE
(WHEN OPTICAL PHASE OF PULSE IS INVERTED BY 180 DEGREES FOR EACH PULSE)

FIG.14
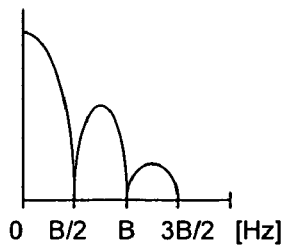
(a) ELECTRIC SPECTRUM OF ENCODER OUTPUT
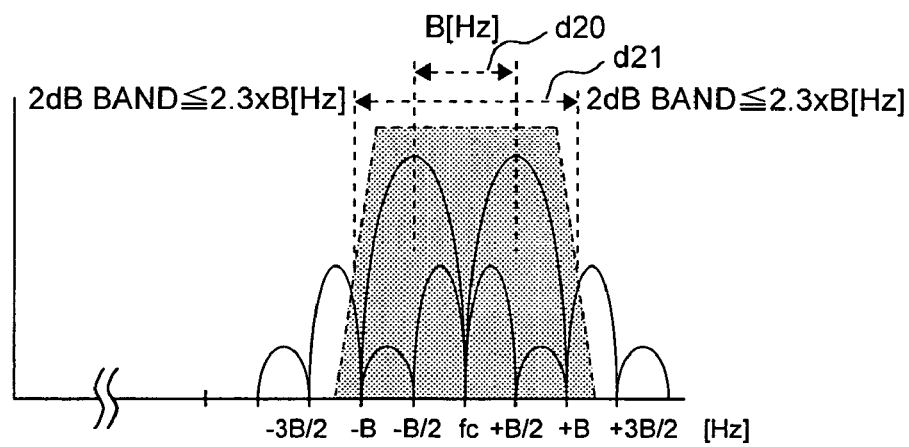
(b) OPTICAL SPECTRUM OF OPTICAL DUOBINARY SIGNAL BY PULSE LIGHT SOURCE
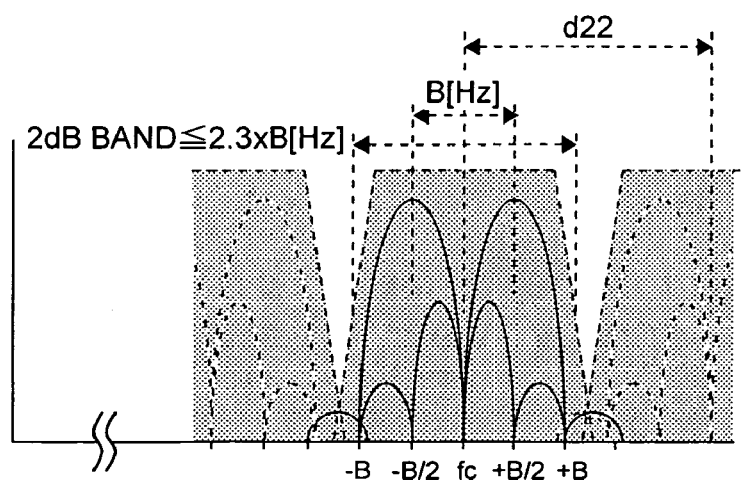
(c) OPTICAL SPECTRUM AFTER WAVELENGTH MULTIPLEXING OPTICAL SPECTRUM WHEN POLARIZATION OF ADJACENT WAVELENGTHS IS MADE TO BE ORTHOGONAL TO EACH OTHER AND WAVELENGTH-MULTIPLEXED

US 7,340,182 B2

MULTIPLEXER

This application is the national phase under 35 U.S.C. § 371 of PCT International Application No. PCT/JP02/02444 which has an International filing date of Mar. 14, 2002, which designated the United States of America.

TECHNICAL FIELD

The present invention relates to a multiplexer based on a duobinary signaling in which a plurality of high-speed digital electric signals are time-division multiplexed into a single digital electric signal and a light is modulated by the single digital electric signal to generate an optical signal.

BACKGROUND ART

An optical transmission apparatus based on duobinary signaling is known, for example, as shown in "The duobinary technique for high-speed data transmission, IEEE Transaction on Communication & Electronics, Vol. 82, 1963" and "Characteristics of Optical Duobinary Signals in Terabit/s Capacity, High-Spectral Efficiency WDM Systems, IEEE Journal of Lightwave Technology, Vol. 16, No. 5, 1998".

Thus, the duobinary signaling had been studied in the 1960's, and it is the basis of the partial response signaling employed in the radio baseband transmission system. The duobinary signaling has also been employed for narrowing optical spectra for optical modulation since the early 1990's. In the duobinary signaling, a binary signal of [0/1] is converted to a ternary signal of [0/1/2], and therefore a frequency bandwidth is compressed. A decoder at a recipient converts a [0, 2] signal to a [0] signal and converts a [1] signal to a [1] signal, and therefore the binary signal of [0/1] generated at a sender is decoded.

FIG. 18 is a block diagram of an optical transmission apparatus using the conventional duobinary signaling. In FIG. 18, N-parallel signals S201 with a low transmission rate of B/N [bit/sec] is multiplexed into a serial binary signal S202 with a transmission rate of B [bit/sec] by a multiplexing circuit 201. This binary signal S202 is transmitted to a precoder 202. The precoder 202 applies a processing for reducing intersymbol interference between bits to the binary signal S202, and thus outputs a binary signal S203. The binary signal S203 is transmitted to an encoder 203 that converts the binary signal S203 to a ternary signal S204.

The ternary signal S204, by an optical modulator 204, is converted to an optical ternary signal in which the optical electric field strength (phase) has a ternary value of [1(0), 1(π), 0(no phase)]. In an optical-to-electrical (O/E) converter 206a included in a decoder 206 at a recipient, the optical ternary signal is converted to an electric current signal depending on the light intensity of the optical ternary signal by a photodetector. As a result, the phase information of the optical ternary signal is lost, and the optical ternary signal is converted to a binary electric signal S206. This binary electric signal S206 corresponds to the binary signal S202 generated at a sender.

The combination of the precoder 202 and the encoder 203 makes it possible to convert, with respect to the binary signal S202, the [0] value to [0],value or [2] value, and the [1] value to [1] value. The precoder 202 has an EXOR gate 202a and a delay circuit 202b. The delay circuit 202b delays an inverting output of the EXOR gate 202a by T (=1/B) [sec], and transmits the output delayed to the EXOR gate 202a.

The encoder 203 includes a delay circuit 203a and an adder 203b. The binary signal S203 is split into two signals in the encoder 203. One of the signals, by the delay circuit 203a, is delayed by a delay time difference T [sec]. The signal delayed and the other signal are added by the adder 203b in an analog, and therefore the adder 203b outputs a ternary signal S204 as the addition result.

Specifically, the encoder 203 can be realized by a configuration shown in FIG. 19. An encoder 213 shown in FIG. 19(a) includes a flip-flop circuit 213a and a low-pass filter 213b. The low-pass filter 213b is connected to the flip-flop circuit 213a in a subsequent stage, and has a cutoff frequency of B/4 [Hz]. An encoder 223 shown in FIG. 19(b) includes an adder 223c and a shift register that is the combination of two flip-flop circuits 223a and 223b. The adder 223c adds two signals output from the flip-flop circuits 223a and 223b.

The encoders 213 and 223 shown in FIG. 19(a) and FIG. 19(b) have the same function. That is, the encoders 213 and 223 generates an output signal from an input signal at a certain timing, in which the input signal is thinned out by one clock and extended by one clock, between two clocks. For example, a signal of "1, 1" is generated from an input signal "1", and a signal of "0, 0" is generated from an input signal "0". The encoder 223 adds these signals S201 and S202 by the adder 223c, and outputs the addition result as a ternary signal S204, as shown in FIG. 20.

In the conventional optical transmission apparatus, the output signal of the precoder 202 and the output signal of the shift register in the encoder 223 change at B [bit/sec] same as the transmission rate B of the binary signal S202, and must be processed at this rate.

Therefore, there is a problem in that an electronic device, for example, a high-speed flip-flop circuit, which can operate at the same transmission rate B [bit/sec] as that of the multiplexed binary signal S202, is essential.

Particularly, in the optical transmission path constituting a backbone network, it is advantageous in view of cost to make the optical transmission rate as high as possible, but the operation speed of the electronic device such as the flip-flop circuit limits the optical transmission rate. Therefore, it is desired to obtain high-speed optical transmission from an electronic device having a speed as low as possible.

It is therefore an object of the present invention to provide a multiplexer that can perform high-speed optical transmission without using the electronic device such as the flip-flop circuit operating at a high speed, enables optical transmission rate exceeding the operation speed limit of the normal flip-flop circuit, and can contribute to low cost and miniaturization.

DISCLOSURE OF THE INVENTION

The multiplexer according to this invention includes a time-division multiplexing unit that multiplexes a plurality of digital signals into two signals each having a first transmission rate; an encoder that generates a ternary electric signal from the two signals; a light source; and an optical modulator that modulates light emitted from the light source by the ternary electric signal, and transmits the light modulated as an optical signal having a second transmission rate twice the first transmission rate, wherein the encoder includes: a first flip-flop circuit that holds one of the two signals at a frequency of the first transmission rate; a second flip-flop circuit that holds other of the two signals at the frequency; an adder that adds signals output from the first and the second flip-flop circuits and transmits a resultant signal to the optical modulator; and a delay unit that delays a signal output from the second flip-flop circuit by the time of the reciprocal of the second transmission rate, with respect to a signal output from the first flip-flop circuit, and transmits the signal delayed to the addition unit.

The multiplexer according to the next invention, in the above invention, further comprises: a multiplexing unit that outputs a plurality of modulated lights having a transmission rate of the predetermined value as wavelength-multiplexed lights; and a polarization adjusting unit on the previous stage of the multiplexing unit that makes the polarization of respective adjacent modulated lights orthogonal to each other, wherein the wavelength interval between the adjacent modulated lights is set to 2.3 times or below of the predetermined value.

According to this invention, the polarization adjusting unit is arranged on the previous stage of the multiplexing unit that makes the polarization of respective adjacent modulated lights orthogonal to each other, and the multiplexing unit outputs a plurality of modulated lights having a transmission rate of the predetermined value as wavelength-multiplexed lights. At this time, the wavelength interval between the adjacent modulated lights is set to 2.3 times or below of the predetermined value.

BRIEF DESCRIPTION OF DRAWINGS

FIG. 11 shows the spectrum and filter property of each section by the multiplexer of a ninth embodiment according to the present invention;

FIG. 13 shows the relation between the pulse waveform and the optical phase;

FIG. 14 shows the relation between the spectrum and the filter property of each section by a CS-RZ modulation method;

BEST MODE FOR CARRYING OUT THE INVENTION

Exemplary embodiments of the multiplexer according to the present invention will be explained in detail, with reference to the accompanying drawings.

Figure 1:
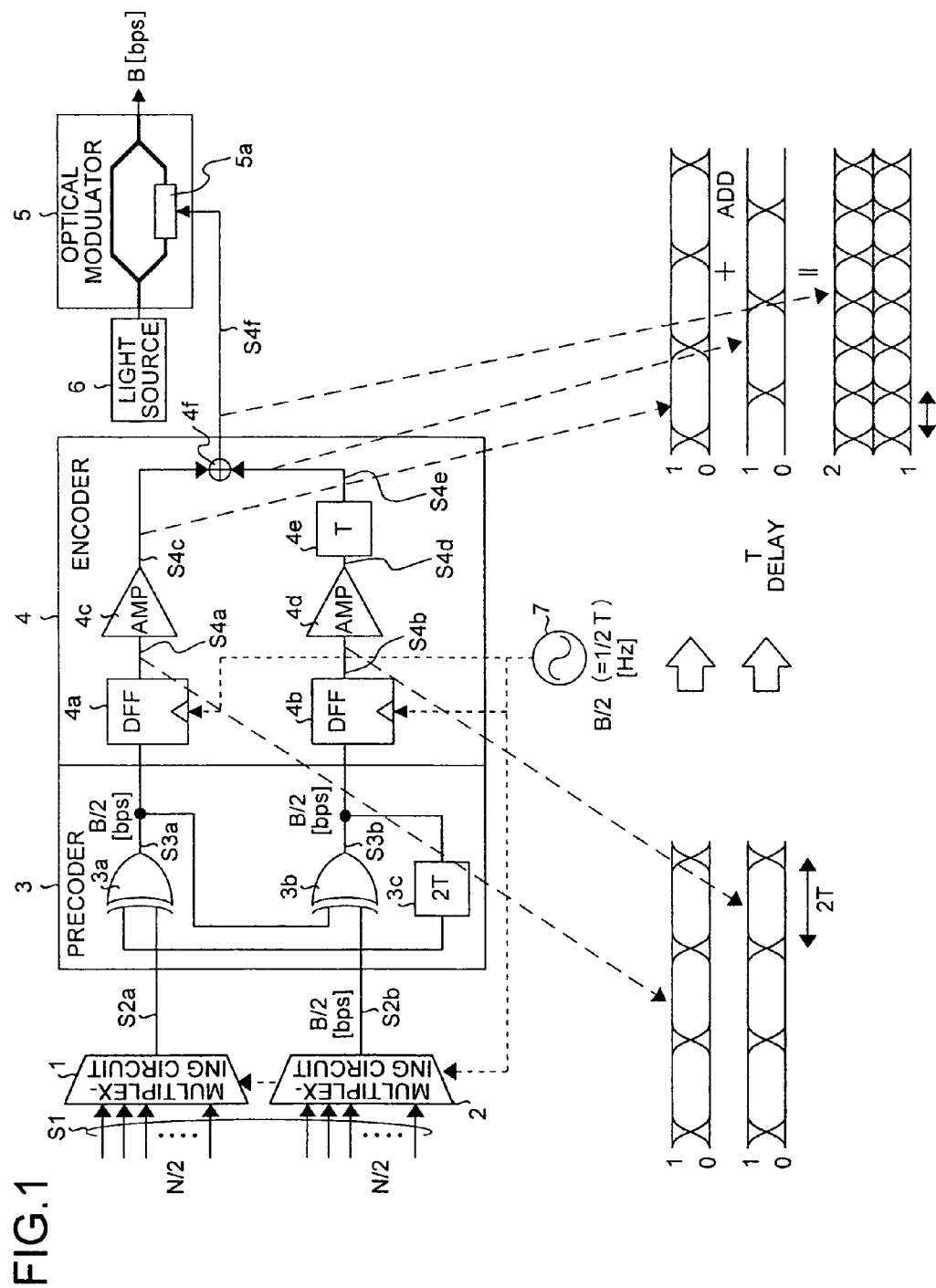
FIG. 1 shows the configuration of a multiplexer of a first embodiment according to the present invention.
Figure 2:
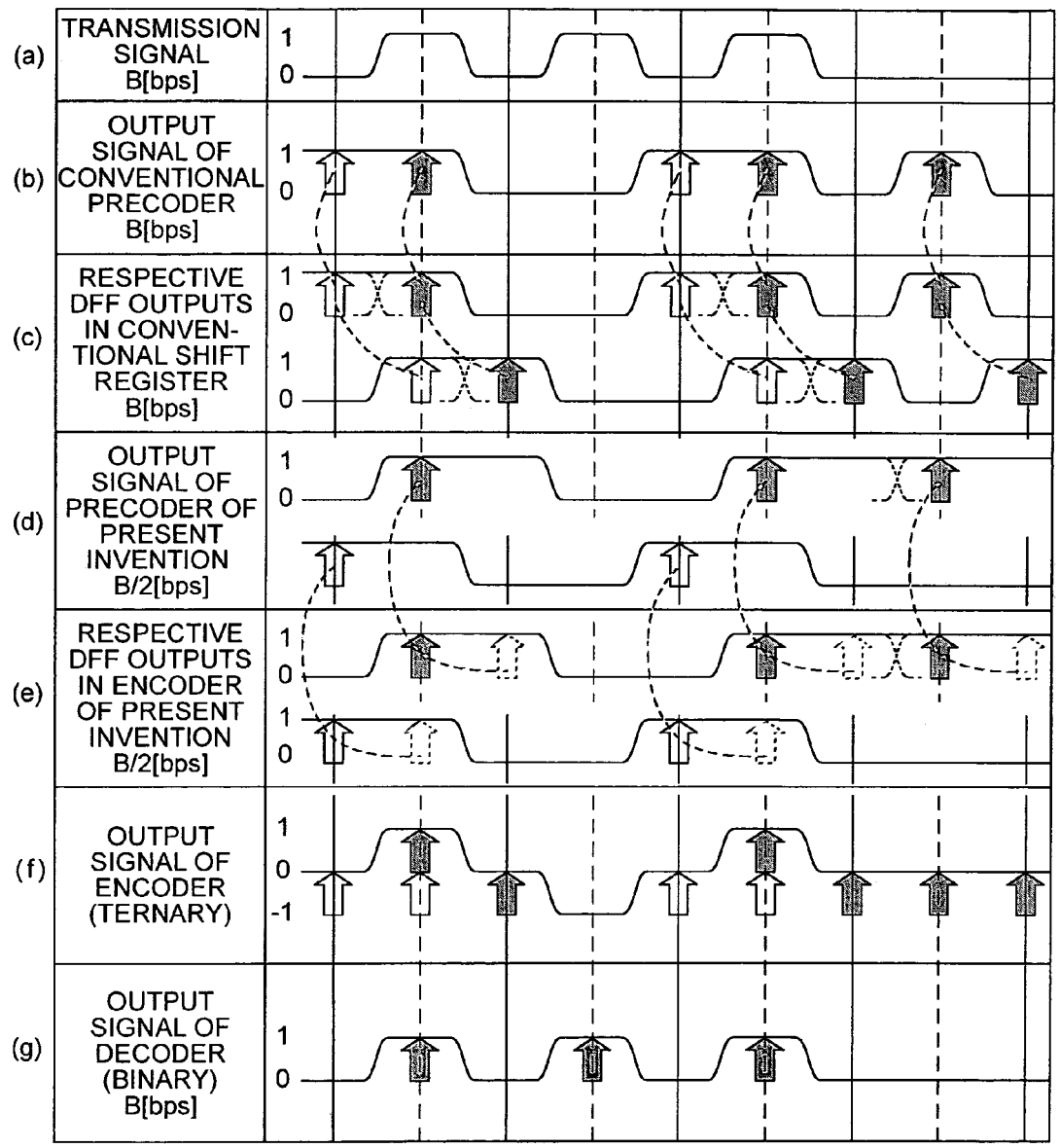
FIG. 2 is a timing chart that shows signal waveforms output from the respective sections of the multiplexer shown in FIG. 1.

FIG. 1 is a block diagram that shows the configuration of a multiplexer of a first embodiment according to the present invention. FIG. 2 shows signal waveforms of some nodes in FIG. 1. Half of N-parallel signals S1 with a low transmission rate (i.e., N/2-parallel signals) are transmitted to multiplexing circuits 1 and 2. The multiplexing circuit 1 multiplexes the N/2-parallel signals into a binary signal S2$a$ with a transmission rate of B/2 [bit/sec], and the multiplexing circuit 2 into a binary signal S2$b$ with the same transmission rate.

These binary signals S2$a$ and S2$b$ are respectively transmitted to EXOR gates 3$a$ and 3$b$ of a precoder 3, and converted to binary signals S3$a$ and S3$b$ with a transmission rate of B/2 [bit/sec]. The binary signal S3$a$ output from the EXOR gate 3$a$ is transmitted to the EXOR gate 3$b$ and a flip-flop circuit 4$a$ in an encoder 4. The binary signal S3$b$ output from the EXOR gate 3$b$ is transmitted to a delay circuit 3$c$ and a flip-flop circuit 4$b$ in the encoder 4. The delay circuit 3$c$ delays the binary signal S3$b$ by the time B (=2T), and transmits the signal delayed to the EXOR gate 3$a$.

The flip-flop circuit 4$a$ shapes the waveform of the binary signal S3$a$, and then transmits the signal shaped as a binary signal S4$a$ to an amplifier 4$c$. On the other hand, the flip-flop circuit 4$b$, like the flip-flop circuits 4$a$, shapes the waveform of the binary signal S3$b$, and then transmits the signal shaped as a binary signal S4$b$ to an amplifier 4$d$. The amplifiers 4$c$ and 4$d$ amplify the binary signals S4$a$ and S4$b$ up to a wanted amplitude. The amplifiers 4$c$ and 4$d$ can cut-disturbance in the signal waveform and thereby shape the signals into a wanted shape, by a saturation characteristic in which the amplitude of the signal is not amplified exceeding a certain level. This waveform shaping can be performed more effectively, if the amplifiers 4$c$ and 4$d$ are integrated into a single device (e.g., a semiconductor chip) together with the flip-flop circuits 4$a$ and 4$b$.

The amplifier 4$c$ outputs a binary signal S4$c$ as the signal S4$a$ amplified. The binary signal S4$c$ is input to an adder 4$f$. On the other hand, the amplifier 4$d$ outputs a binary signal S4$d$ as the signal S4$b$ amplified. The binary signal S4$d$ is input to a delay circuit 4$e$, and then is delayed by T [sec] (=1/B) as compared with the binary signal S4$c$. The signal delayed is input to the adder 4$f$ as a binary signal S4$e$. The adder 4$f$ adds the binary signals S4$c$ and S4$e$ to convert these signals to a ternary signal S4$f$, and outputs the ternary signal S4$f$ as a modulating signal of an optical modulator 5. That is, the optical modulator 5, by this ternary signal S4f, modulates the light emitted from the light source 6.

The optical modulator 5 has a splitter, a coupler, and a phase modulator 5a. Light emitted from the light source 6 is split into two lights by the splitter, and one of the two lights is incident on the phase modulator 5a. The phase modulator 5a shifts the light by the modulating signal. The light shifted and the other light of the two lights are added by the coupler. When the phases of two lights which are incident on the coupler are matched, the coupler outputs high intensity optical signal. When the difference between the phases is π [rad], the coupler outputs low intensity optical signal. In other words, when the phase shift quantity in the phase-modulator 5a is 0 [rad], the optical signal output from the coupler has high intensity, and when the phase shift quantity is π [rad], the optical signal has low intensity. In addition, when the phase shift quantity is 2π [rad], the optical signal has high intensity again. As a result, a binary optical signal is generated from the ternary modulating signal.

The reason that the operation speed of the flip-flop circuits 4a and 4b is sufficient at B/2 [bit/sec] will be explained below, with reference to the timing chart shown in FIG. 2. The signal waveform shown in FIG. 2(a) is of a transmission signal with the transmission rate of B [bit/sec] to be transmitted, and is represented by binary digits "1" and "0". Conventionally, this transmission signal is converted to a binary signal with B [bit/sec] by the precoder 202, and then input to the shift register in the encoder 203. Therefore, the precoder 202 and the shift register in the encoder 203 must be operated at B [bit/sec].

Referring to the arrows shown in FIGS. 2(b) and (c), the conventional encoder 203 extends, by the two flip-flop circuits in the encoder 203, two signals having one clock width input from the precoder 202 for the time corresponding to two clocks. After that, the signals are added.

On the other hand, the precoder 3 of the first embodiment outputs, as shown in FIG. 2(d), two binary signals S2a and S2b that are toggled with time interval of 2 clock length. Since the flip-flop circuits 4a and 4b that hold these binary signals S2a and S2b operate at B/2 [bit/sec] as shown in FIG. 2(e), the precoder 3 can operate the respective binary signals that has been extended to two clock width, as in the conventional method. Similarly, the signal output from the adder 4f becomes the same ternary signal as the conventional signal shown in FIG. 2(f).

The combination of the precoder 3 and the encoder 4 can convert a binary signal to a ternary signal using half cycle of the conventional clock. As a result, the multiplexer according to this embodiment can process a signal with B [bit/sec] at a low speed (i.e., B/2 [bit/sec]), without a high-speed operation electronic device for processing the signal with B [bit/sec]. In particular, binary to ternary conversion exceeding a limit of a process speed of the flip-flop circuit is achieved, and thereby it is possible to process the signals at higher speed.

Figure 3:
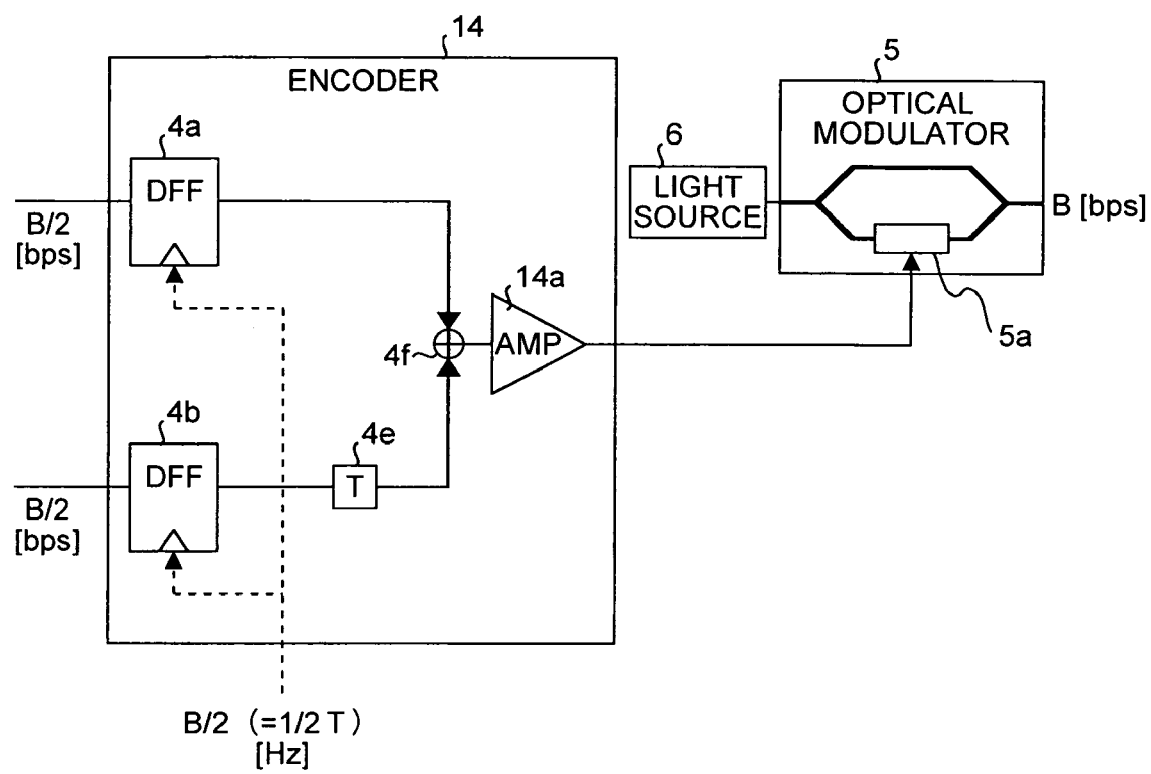
FIG. 3 shows the configuration of an encoder in the multiplexer of a second embodiment according to the present invention.

A second embodiment according to the present invention will be explained below. FIG. 3 shows the configuration of an encoder in a multiplexer of the second embodiment. The encoder 14 includes an amplifier 14a that is arranged at a subsequent stage of the adder 4f, instead of the amplifiers 4c and 4d in the encoder 4. The other configuration is the same as that of the first embodiment, and the same constituents are denoted by the same reference characters.

The amplifier 14a differs from the amplifiers 4c and 4d in that a ternary signal is input. Therefore, the amplifier 14a does not have the same saturation characteristic as that of the amplifiers 4c and 4d. Since the number of amplifiers is smaller than that of the encoder 4, miniaturization of the encoder 14 and the multiplexer having it is achieved.

Figure 4:
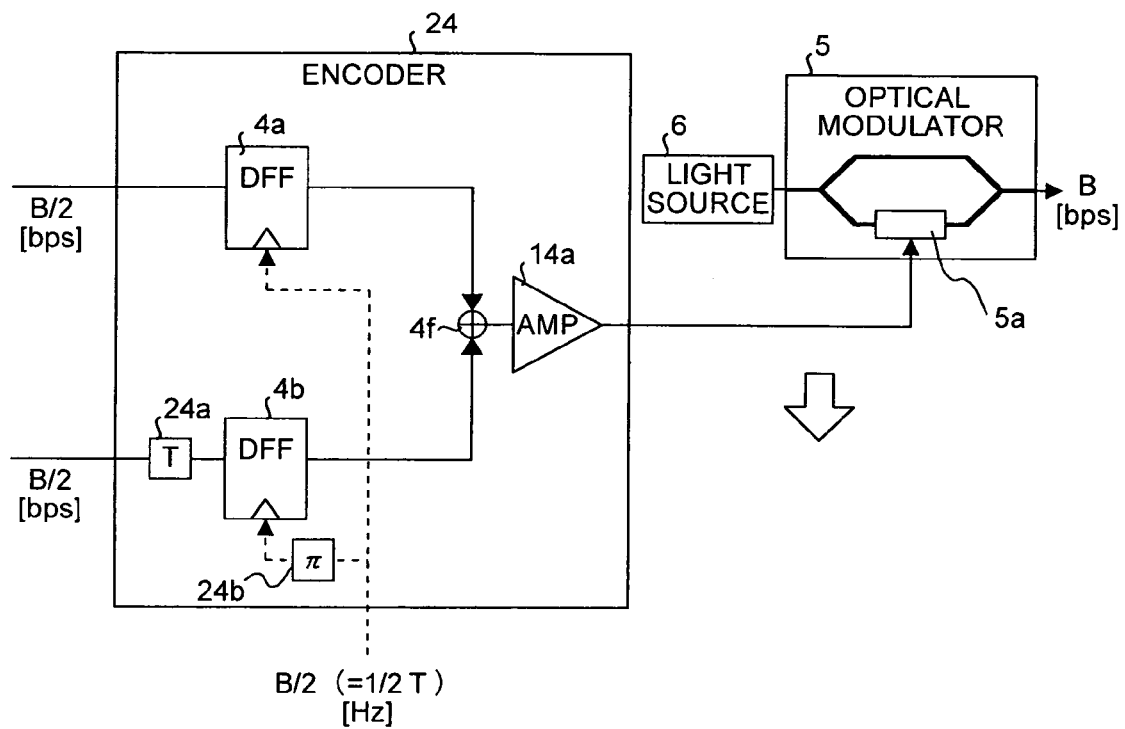
FIG. 4 shows the configuration of an encoder in the multiplexer of a third embodiment according to the present invention.

A third embodiment according to the present invention will be explained below. FIG. 4 shows the configuration of an encoder in a multiplexer of the third embodiment. The encoder 24 includes a delay circuit 24a instead of the delay circuit 4e shown in the second embodiment, and a phase shifter 24b. The delay circuit 24a is arranged at the previous stage of the flip-flop circuit 4b. The phase shifter 24b shifts the phase of the clock of the flip-flop circuit 4b by p [rad]. As a result, a delay difference of T [sec] (=1/B) is given between the two binary signals input to the adder 4f. The flip-flop circuit 4b latches, by this phase shifter 24b, the signal delayed by the delay circuit 24a, without a new shift. The other configuration is the same as that of the second embodiment, and the same constituents are denoted by the same reference characters.

When the flip-flop circuits 4a and 4b and the adder 4f are integrated into the same Integrated Circuit (IC), the delay circuit 24a can be arranged outside of the IC. Generally, it is preferable that the transmission path between the adder 4f and the flip-flop circuits 4a and 4b is as short as possible, in view of reducing the delay and influence of a return of the signal. Therefore, the delay circuit 24a is arranged outside the IC, and thus it is possible to short the transmission path. As a result, the encoder 24 can process the signals accurately.

A fourth embodiment according to the present invention will be explained below. Any optical modulator In the first to the third embodiments is a Mach-Zehnder modulator having a control terminal. A multiplexer of this fourth embodiment includes a Mach-Zehnder type modulator having two control terminals as the optical modulator.

Figure 5:
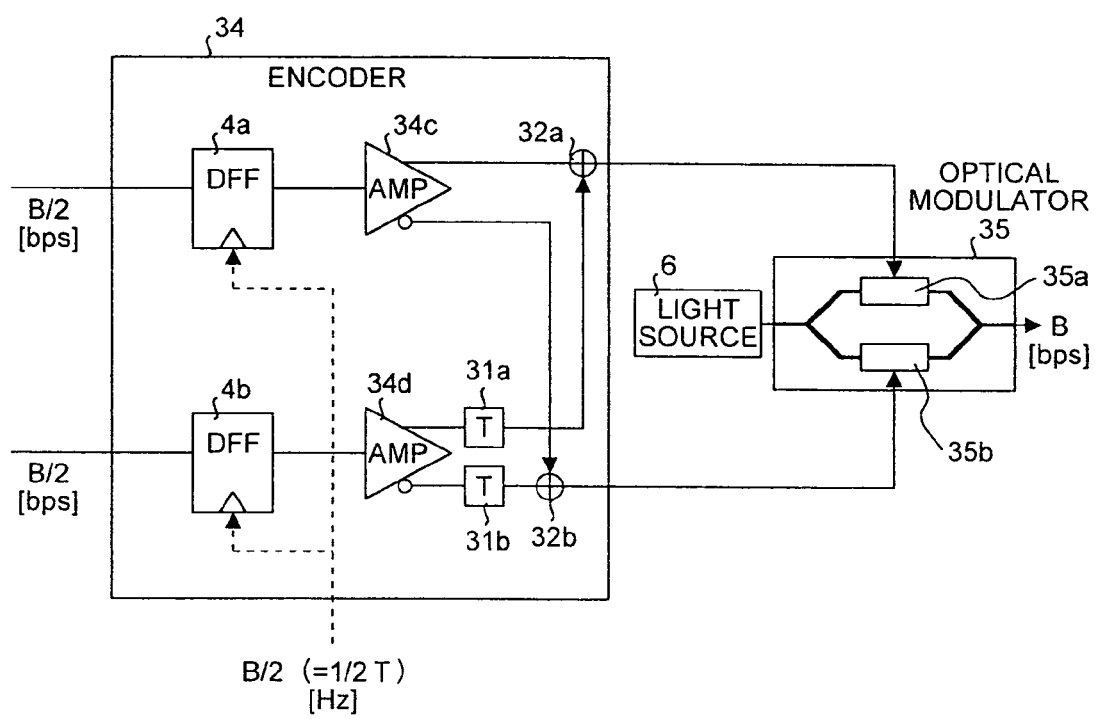
FIG. 5 shows the configuration of an encoder in the multiplexer of a fourth embodiment according to the present invention.

FIG. 5 shows the configuration of an encoder in the multiplexer of the fourth embodiment. The encoder 34 corresponds to the encoder 4 of the first embodiment, and have amplifiers 34c and 34d corresponding to the amplifiers 4c and 4d, two delay circuits 31a and 31b corresponding to the delay circuit 4e, and two adders 32a and 32b corresponding to the adder 4f. An inverting outputs and an non-inverting outputs of the amplifiers 34c and 34d are finally input to the two control terminals of a Mach-Zehnder modulator 35. The other configuration is the same as that in the first embodiment, and the same constituents are denoted by the same reference characters.

The optical modulator 35 includes optical phase modulators 35a and 35b that are controlled respectively by the two control signals input from the two control terminals. In the optical modulator 35, one of two lights into which are split by the splitter is incident on the optical phase modulator 35a, and the other light is incident on the optical phase modulator 35b. The phase difference between two lights that are output from the optical phase modulators 35a and 35b becomes π [rad], when a phase shift in the optical phase modulator 35a is set at +π/2 [rad] and a phase shift in the optical phase modulator 35b is set at −π/2 [rad]. As a result, the phase shift quantity in each optical phase modulator becomes small, thereby the optical modulation spectrum becomes narrow, as compared with the optical modulator having only one control terminal.

The control signals for the optical phase modulators 35a and 35b are the two ternary signals respectively output from the adder 32a and 32b. That is, one of the control signals is generated from an addition of non-inverting outputs of the amplifiers 34c and 34d, and the other control signal is generated from an addition of inverting outputs of the amplifiers 34c and 34d. The two ternary signals have a symmetrical waveform each other in which the polarity of the signals is inverted, when the level of the ternary signal is represented by [1, 0, −1]. Therefore, when these signals are transmitted parallel to each other as differential signals, the signals are not influenced from external noise easily.

Figure 6:
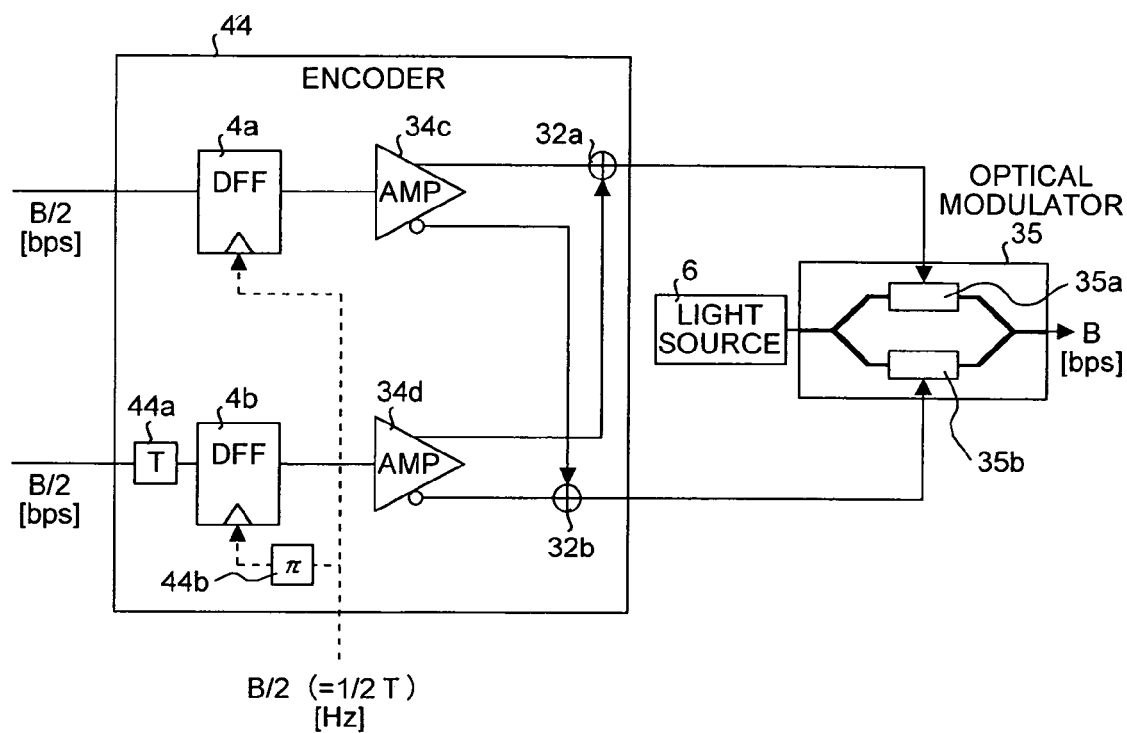
FIG. 6 shows the configuration of another encoder in the multiplexer of the fourth embodiment according to the present invention.

FIG. 6 shows the configuration of another encoder in the multiplexer of the fourth embodiment. The encoder 44 shown in FIG. 6 corresponds to the encoder 24 shown in the third embodiment, and includes a delay circuit 44a instead of the delay devices 31a and 31b in the encoder 34 shown in FIG. 5. The delay circuit 44a is arranged at the previous stage of the flip-flop circuit 4b. The encoder 44 also includes a phase shifter 44b that shifts the phase of the clock of the flip-flop circuit 4b by $\pi$ [rad]. As a result, a delay difference of T [sec] (=1/B) is given between the two binary signals input to the adders 32a and 32b. The flip-flop circuit 4b latches, by this phase shifter 44b, the signal delayed by the delay circuit 44a, without a new shift, as in the third embodiment. The other configuration is the same as that of the encoder shown in FIG. 5, and the same constituents are denoted by the same reference characters.

The binary signal is converted to the ternary signal and output at a high speed, without using a high-speed electronic device, likewise with respect to the optical modulator having two control terminals, similarly to the functions of the first to the third embodiments with respect to the optical modulator having one control terminal.

A fifth embodiment according to the present invention will be explained below. In the precoder 3 shown in the first embodiment, the non-inverting output of the EXOR gate 3a is input to the input terminal of the EXOR gate 3b and the flip-flop circuit 4a at the subsequent stage. Therefore, the fan-out respective EXOR gates 3a and 3b becomes two.

Figure 7:
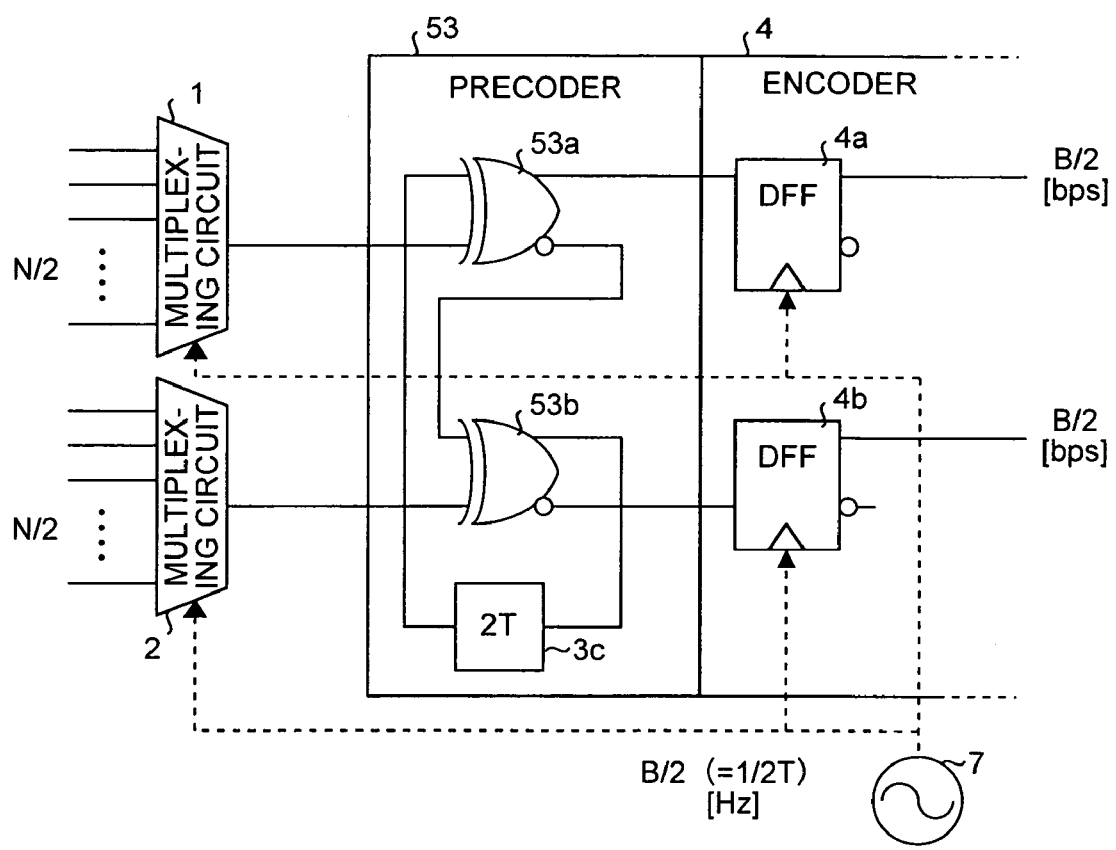
FIG. 7 shows the configuration of a precoder in the multiplexer, being a fifth embodiment of the present invention.

On the other hand, as shown in FIG. 7, the precoder 53 of the fifth embodiment includes EXOR gates 53a and 53b each having a non-inverting output and an inverting output, in place of the respective EXOR gates 3a and 3b. The inverting output of the EXOR gate 53a is connected to the input terminal of the EXOR gate 53b, and the non-inverting output of the EXOR gate 53a is connected to the input terminal of the EXOR gate 53a via the delay circuit 3c. The other configuration is the same as that in the first embodiment, and the same constituents are denoted by the same reference characters.

Since the fan-out of EXOR gates 53a and 53b becomes one, the multiplexer can operate at higher speed.

Figure 8:
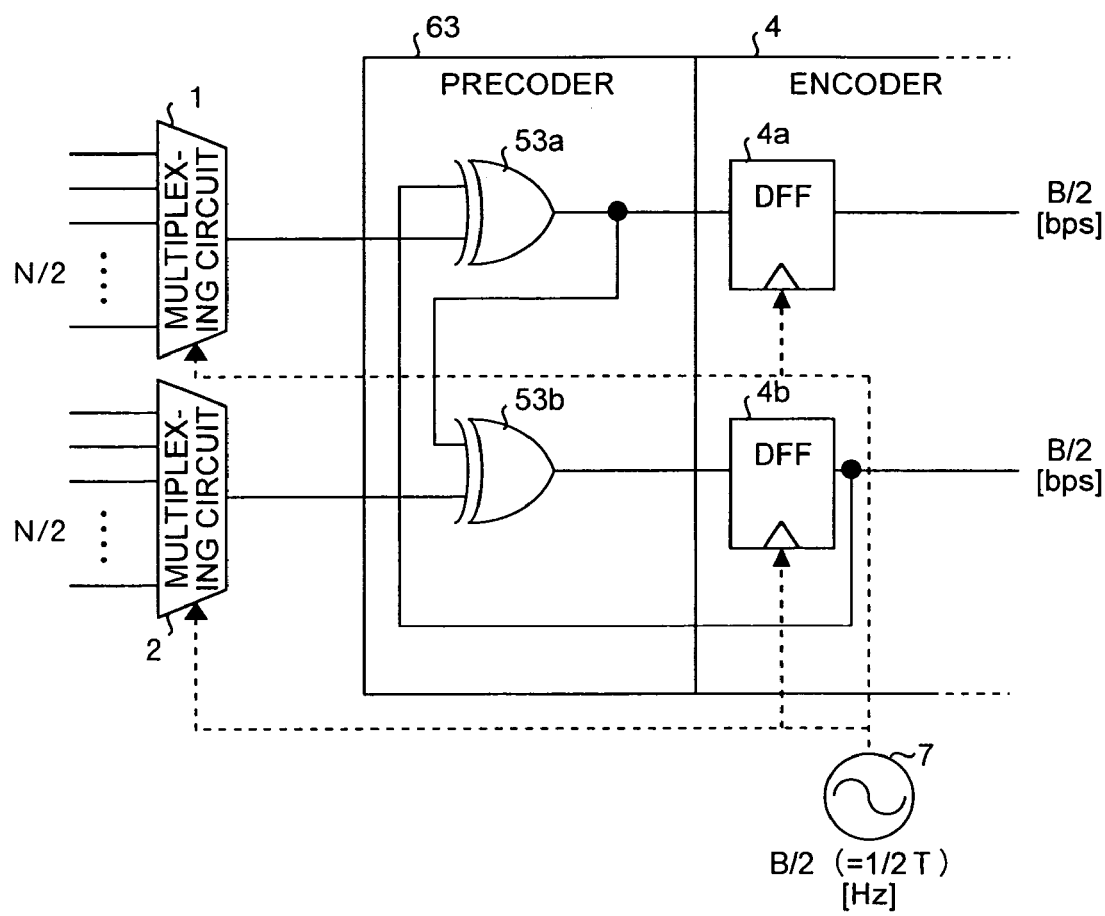
FIG. 8 shows the configuration of a precoder and an encoder in the multiplexer, being a sixth embodiment of the present invention.

A sixth embodiment according to the present invention will be explained below. FIG. 8 shows the configuration of a precoder and an encoder in the multiplexer of the sixth embodiment. In the fifth embodiment, the signal that is output from the EXOR gate 53b is delayed by 2T [sec], and then the signal delayed is input to the EXOR gate 53a.

On the other hand, as shown in FIG. 8, in the precoder and the encoder of the sixth embodiment, the output signal of the flip-flop circuit 4b arranged at the subsequent stage of the EXOR gate 53b is input to the EXOR gate 53a as a signal delayed by 2T [sec].

In other words, the mutiplexer of the sixth embodiment employs the output signal of the flip-flop circuit 4b as a delayed signal, without the delay circuit 3c shown in the fifth embodiment. As a result, the number of constituents of the multiplexer is reduced, thereby miniaturization of the multiplexer is achieved.

Figure 9:
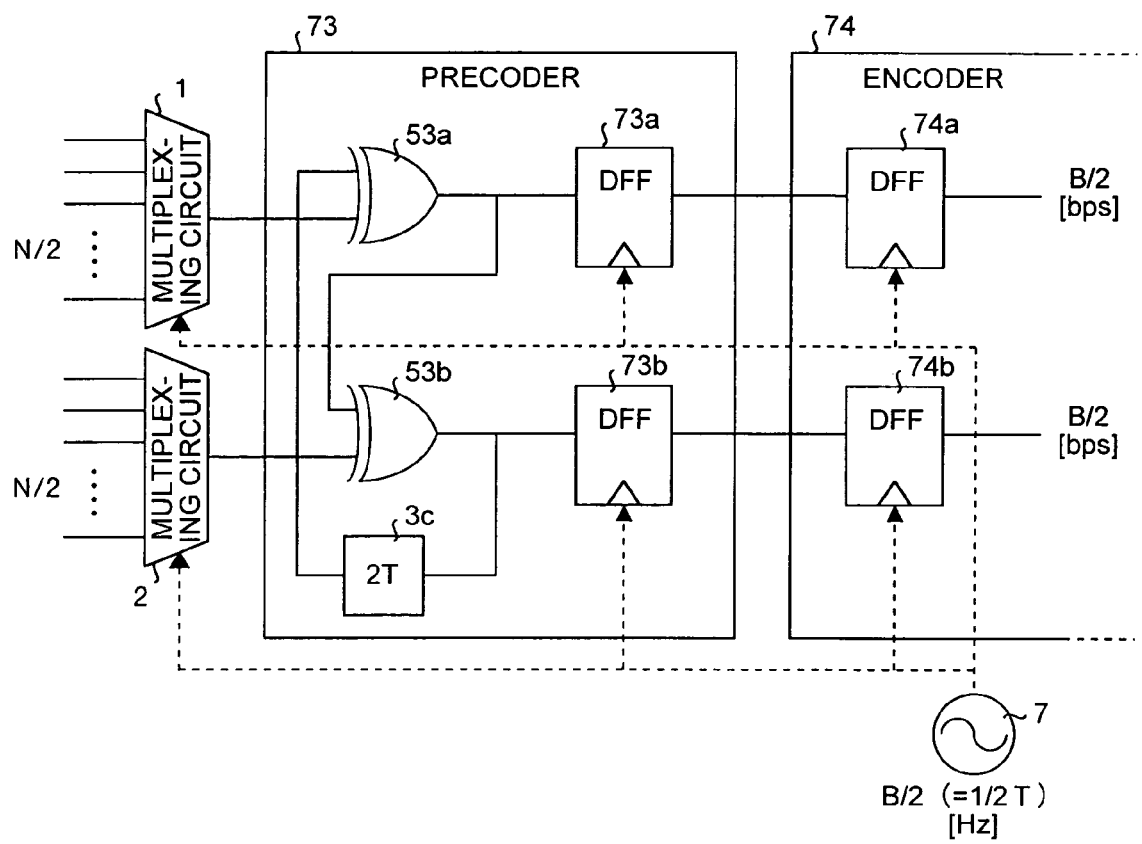
FIG. 9 shows the configuration of a precoder and an encoder in the multiplexer, being a seventh embodiment of the present invention.

A seventh embodiment according to the present invention will be explained below. FIG. 9 shows the configuration relating to a precoder and an encoder in the multiplexer of the seventh embodiment. In FIG. 9, the precoder 73 and the encoder 74 respectively correspond to the precoder 53 and the encoder 4 that are described in the fifth embodiment. The precoder 73 and the encoder 74 are formed as respective different ICs.

As a result, since the IC for realizing the precoder 73 and the IC for realizing the encoder 74 are connected through signal wires, the two binary signals output from the precoder 73 may have different timing resulting from a difference of propagation delay between the signal wires.

The multiplexer of the seventh embodiment includes a clock generator 7, the precoder 73 having flip-flop circuits 73a and 73b, and the encoder 74 having flip-flop circuits 74a and 74b. The two flip-flop circuits 73a and 74a correspond to the flip-flop circuit 4a, and the two flip-flop circuits 73b and 74b correspond to the flip-flop circuit 4b. The flip-flop circuits 73a and 73b and the flip-flop circuits 74a and 74b are synchronized with a clock generated from the clock generator 7. However, the binary signal transmitted through the flip-flop circuits 73a and 74a the two lines are delayed by one clock.

Since the flip-flop circuits 73a and 73b are arranged at the output side of the precoder 73, and the flip-flop circuits 74a and 74b are arranged at the input side of the encoder 74, even when the precoder 73 and the encoder 74 are installed into different ICs, the delay difference between the signal wires connecting between the ICs is reduced.

Figure 10:
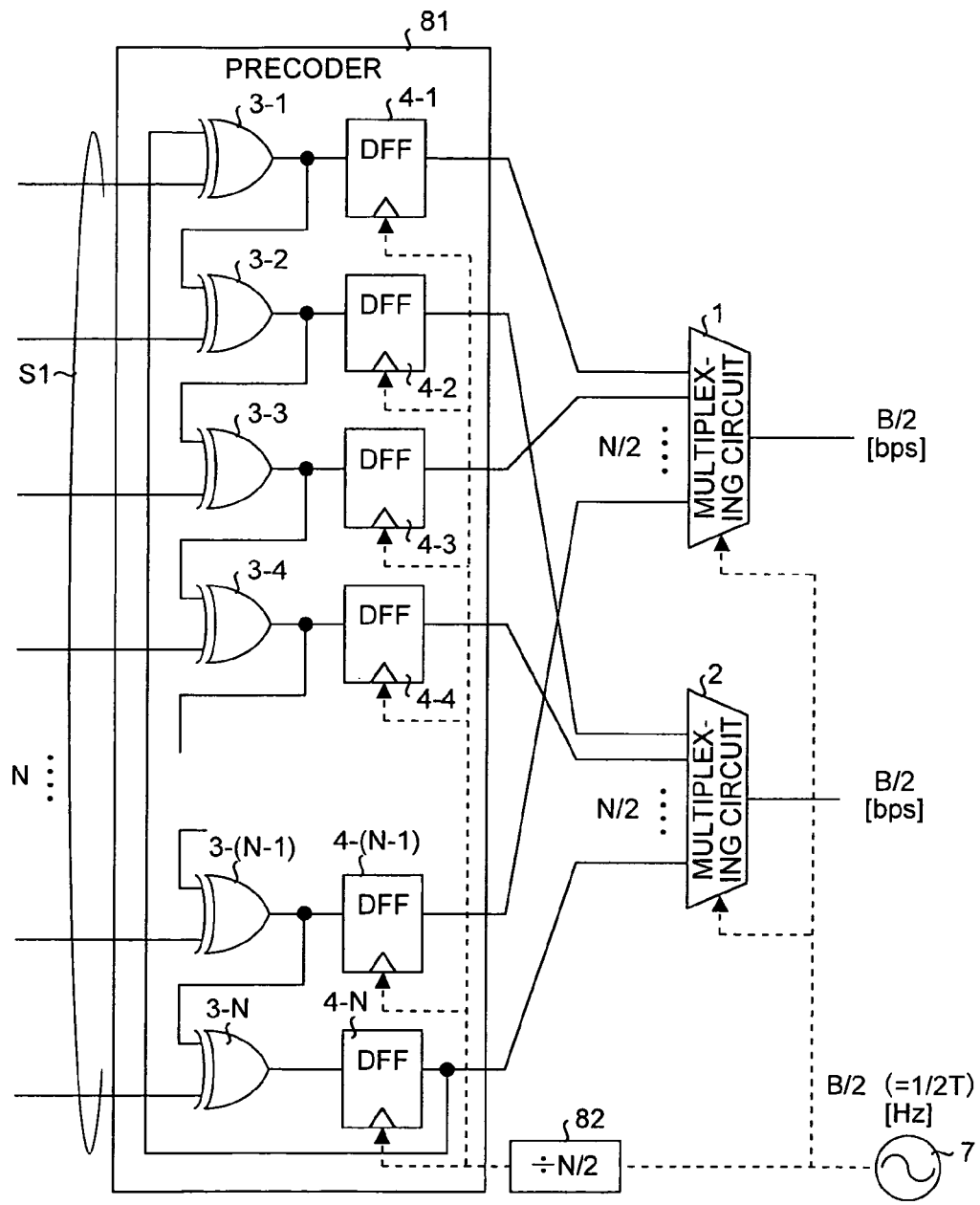
FIG. 10 shows the configuration of a precoder and an encoder in the multiplexer of an eighth embodiment according to the present invention.

An eighth embodiment according to the present invention will be explained below. FIG. 10 shows the configuration of a precoder in the multiplexer of the eighth embodiment. In the first to the seventh embodiments, the precoder is arranged at the subsequent stage of the multiplexing circuits 1 and 2. However since the transmission rate at which the precoder processes is B/2 [bit/sec]; higher-speed processing is still required.

On the other hand, a precoder of the eighth embodiment is arranged at the previous stage of the multiplexing circuits 1 and 2, so as to precode the N-parallel signals S1.

As shown in FIG. 10, this precoder 81 includes N EXOR gates 3-1 to 3-N respectively and N flip-flop circuits 4-1 to 4-N. N-combinations of the EXOR gate 3-1 and the flip-flop circuit 4-1 to the EXOR gate 3-N and the flip-flop circuit 4-N are arranged respectively for the N-parallel signals S1 with a transmission rate of B/N [bit/sec]. The reason for providing the flip-flop circuits 4-1 to 4-N is for timing adjustment with respect to the respective multiplexing circuits 1 and 2. The flip-flop circuit 4-N has also a function as a delay circuit, as shown in the seventh embodiment.

The N-parallel signals are input to the EXOR gates 3-1 to 3-N respectively. Outputs of the EXOR gates 3-1 to 3-N are input to the flip-flop circuits 4-1 to 4-N respectively. The outputs of the EXOR gates 3-1 to 3-(N−1) are respectively input to the adjacent EXOR gates 3-2 to 3-N. In other words, an EXOR gate referred with an index transmits the output thereof to another EXOR gate referred with the index incremented by one.

The flip-flop circuits referred with odd index, that is, the flip-flop circuits 4-1, 4-3, 4-5, . . . transmits the output thereof to the multiplexing circuit 1. The flip-flop circuits referred with even index, that is, the flip-flop circuits 4-2, 4-4, 4-6, . . . transmits the output thereof to the multiplexing circuit 2. The holding time of the flip-flop circuit 4-N is employed as a delay, and the output of flip-flop circuit 4-N is input to the EXOR gate 3-1.

The multiplexing circuits 1 and 2 multiplex the N/2 output signals input from the precoder 81, respectively, and transmit the signals multiplexed to the encoder (not shown). The multiplexing circuits 1 and 2 process based on the B/2

[bit/sec] clock generated by the clock generator 7. However, since the processing of the flip-flop circuits 4-1 to 4-N is for the N-parallel signals, the respective flip-flop circuits 4-1 to 4-N synchronously operate at the low-speed clock generated by a frequency divider 82 that divides the frequency of the clock of B/2 [bit/sec] by N/2.

Since the N-parallel signals S1 have a low transmission rate, the EXOR gates 3-1 to 3-N can process the signals S1 with low load, and achieve precoding completely. Particularly, in the optical communication, when signal with a high-transmission rate, for example, within a range from 10G to 40G [bit/sec], is processed by the precoder, the time delay of each EXOR gate itself cannot be ignored. This time delay prevents the output of an EXOR gate from being input to another EXOR gate within the delay time 2T. However, if the precoder is arranged at the previous stage of the multiplexing circuits 1 and 2, the delay time increases to 2T×N [sec], and hence realizability of high-speed communication increases.

The precoder 81 can be similarly operated, even when the precoder 81 may be arranged in a stage where not only N parallel signals but N/2 parallel signals or N/4 signals are input, in view of a unit of IC integration and power consumption.

A Ninth embodiment according to the present invention will be explained below. In the first to the eighth embodiments, the light source 6 is not particularly mentioned, but in this ninth embodiment, a DC light source that continuously emits light with a certain power is used as the light source 6.

FIG. 11 shows electric spectrum of the encoder, the optical spectrum of duobinary signal, when the DC light source is used as the light source. For example, when the DC light source is used as the light source 6 in FIG. 1, the spectrum of the duobinary signal having a ternary electric value output from the encoder 4 becomes a spectrum shown in FIG. 11(*a*). This duobinary signal is obtained from the addition of two binary signals with B/2 [bit/sec], and hence as shown by a solid line in FIG. 11(*a*), the spectrum of the duobinary signal becomes a spectrum having the same shape as that of the binary signal with B/2 [bit/sec]. The broken line shown in FIG. 11(*a*) indicates the spectrum of a binary signal with B [bit/sec].

The optical spectrum modulated with the spectrum shown by the solid line in FIG. 11(*a*) spreads across the center thereof, as shown by the solid line in FIG. 11(*b*). The center of the optical spectrum is the photocarrier frequency fc [Hz]. Since the transmission signal component of the optical spectrum is included in the main lobe of fc±(B/2) [Hz], even when the spectrum outside this frequency band is cut by an optical filter, the waveform of the transmission signal component is not deformed. This optical filter is arranged at the subsequent stage of the optical modulator.

The optical filter is more superior than the electric filter in view of having filter property in higher-order frequency and steep slopes.

The bandwidth of the optical filter may be fc±0.5×B [Hz]. It is preferable that the 2 dB bandwidth d10 (see FIG. 11(*b*)) having a flat optical phase characteristic is within fc±0.6×B [Hz]. When the optical filter has an ideal phase characteristic, it is possible to design the bandwidth as about fc±0.7× 0.5×B [Hz] to identify "0, 1".

FIG. 11(*c*) shows an optical spectrum, when a plurality of optical duobinary signals are wavelength-division multiplexed. In FIG. 11(*c*), the wavelength interval d11 is set to B [Hz]±α. The wavelength interval d11 may be set to not more than B [Hz], but it is caused a disadvantage.

The disadvantage is reduced by a polarization-adjusting in which the adjacent wavelength is orthogonal to each other, as described below. Concretely, the polarization-adjusting reduces beat noise in a region where-the spectrum is overlapped.

FIG. 11(*d*) shows an electric spectrum after one wavelength has been extracted and square-law detected using a photodetector at the recipient. In the optical spectral range, ternary transmission using the optical phase is performed. However, with the photodetector, the phase information degenerates., and is converted to a binary signal indicating power. As a result, as shown in FIG. 11(*d*), the spectrum is converted to a B [bit/sec] binary signal spectrum.

Figure 12:
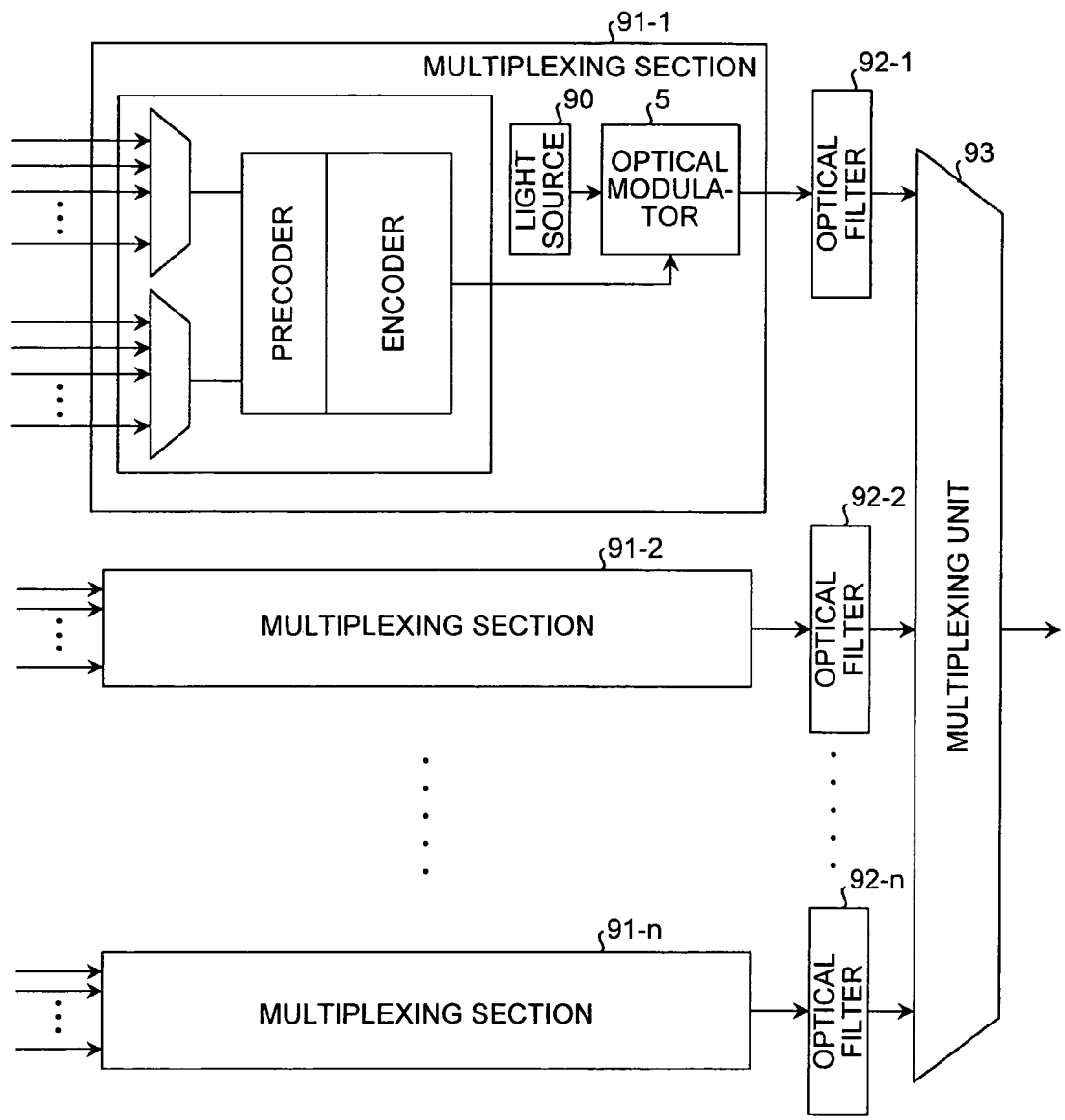
FIG. 12 shows the configuration of the multiplexer realizing the wavelength multiplexing by the multiplexing section shown in FIG. 11.

FIG. 12 shows the configuration of a multiplexer that perfomes wavelength-division multiplexing. In FIG. 12, multiplexing sections 91-1 to 91-n corresponding to the multiplexer of any one of the first to the eighth embodiments have a light source 90 as a DC light source that emits light with the photocarrier frequency. The optical filters 92-1 to 92-n passing the respective photocarrier frequency are arranged at the subsequent stage of the multiplexing sections 91-1 to 91-n, respectively. Further, n optical signals output from the optical filters 92-1 to 92-n are wavelength-multiplexed by a coupler 93. The wavelength-multiplexed lights are incident onto a single optical fiber.

Polarization adjustors are arranged between the respective optical filters 92-1 to 92-n and the multiplexing device 93 so that polarization of the adjacent wavelength is orthogonal to each other.

Since the spectrum width having the encoder output or a signal component of the optical duobinary signal is reduced by half, the degree of wavelength-division multiplexing can be doubled by performing filtering for the spectrum width, thereby a high-speed large capacity optical communication can be easily realized.

A tenth embodiment according to the present invention will be explained below. In the ninth embodiment, a DC light source is used as the light source 6, but in this tenth embodiment, a pulse light source in which the power changes at a B [Hz] cycle same as the transmission rate of B [bit/sec] is used as the light source 6.

The light intensity modulating method using this pulse light source is referred to as RZ (Return to Zero) modulation. FIG. 13 is a diagram to explain the optical phase of the pulse and the waveform of this pulse. FIG. 13(*a*) shows an optical pulse waveform at the transmission end, and two optical pulses are not overlapped on each other. However, when the optical pulse is propagated for a long distance, it is affected by wavelength dispersion, and the pulse width is enlarged to thereby cause an overlapped portion E1 (see FIG. 13(*b*)) in the adjacent pulses.

When the optical phases of the adjacent pulses are the same phase, the optical phase is reinforced at the portion E1 where the pulse width is overlapped, to thereby generate a portion where the light intensity is reinforced between the pulses. In the long distance optical transmission system having the nonlinearity of the optical transmission path, the apex shape between pulses gradually increases, thereby the original optical pulse waveform may be considerably disturbed.

On the other hand, if the optical phases of the adjacent pulses are inverted by 180 degrees for each pulse, since the phase is inverted at the portion E2 (see FIG. 13(*c*)) where the pulses are overlapped, these pulses are weakened with each other, and hence the apex shape is not generated between the pulses. In such RZ modulation method, if it is averaged timewise, the photocarrier component is suppressed. Therefore, it is referred to as a CS (Carrier Suppressed)-RZ modulation method. This CS-RZ modulation method is a method advantageous for the long distance optical transmission system having the nonlinearity of the optical signal.

FIG. 14 shows one example of a spectral shape in the CS-RZ modulation method. FIG. 14(a) shows an electric spectrum in the encoder output. FIG. 14(b) shows an optical spectrum modulated by the optical modulator. When the power of the pulse light source changes at B [Hz], and the phase thereof is inverted by 180 degrees for each pulse, the optical spectrum has a shape, as shown in FIG. 14(b), such that the optical spectrum in FIG. 11(b) is shifted by B [Hz], and is added together.

Since the main component of the RZ modulated signal is included in the main lobe having two apexes, the signal band is included in fc±B [Hz]. The side lobe can be suppressed using the optical filter, as in the ninth embodiment. In the 2 dB band d21 of the optical filter, the waveform is not deformed even at 2B [Hz] or 0.7×2×B [Hz], as in the ninth embodiment, but practically, it is preferable to set cut-off frequency of the 2 dB band of the optical filter at not more than 2.3 [Hz]. The reason for setting the bandwidth to 2.3×B [Hz] is that the sum of the bandwidth 1.3×B [Hz] as in the ninth embodiment and the interval B [Hz] between the two main lobes becomes 2.3 [Hz].

FIG. 14(c) shows an optical spectrum when the optical duobinary signal by the CS-RZ modulation method is wavelength-division multiplexed. As shown in FIG. 14(c), even when the wavelength-division multiplexing employs the CS-RZ modulation method, many wavelengths can be multiplexed with less wavelength interval, and the signal transmission can be preferably performed.

Figure 15:
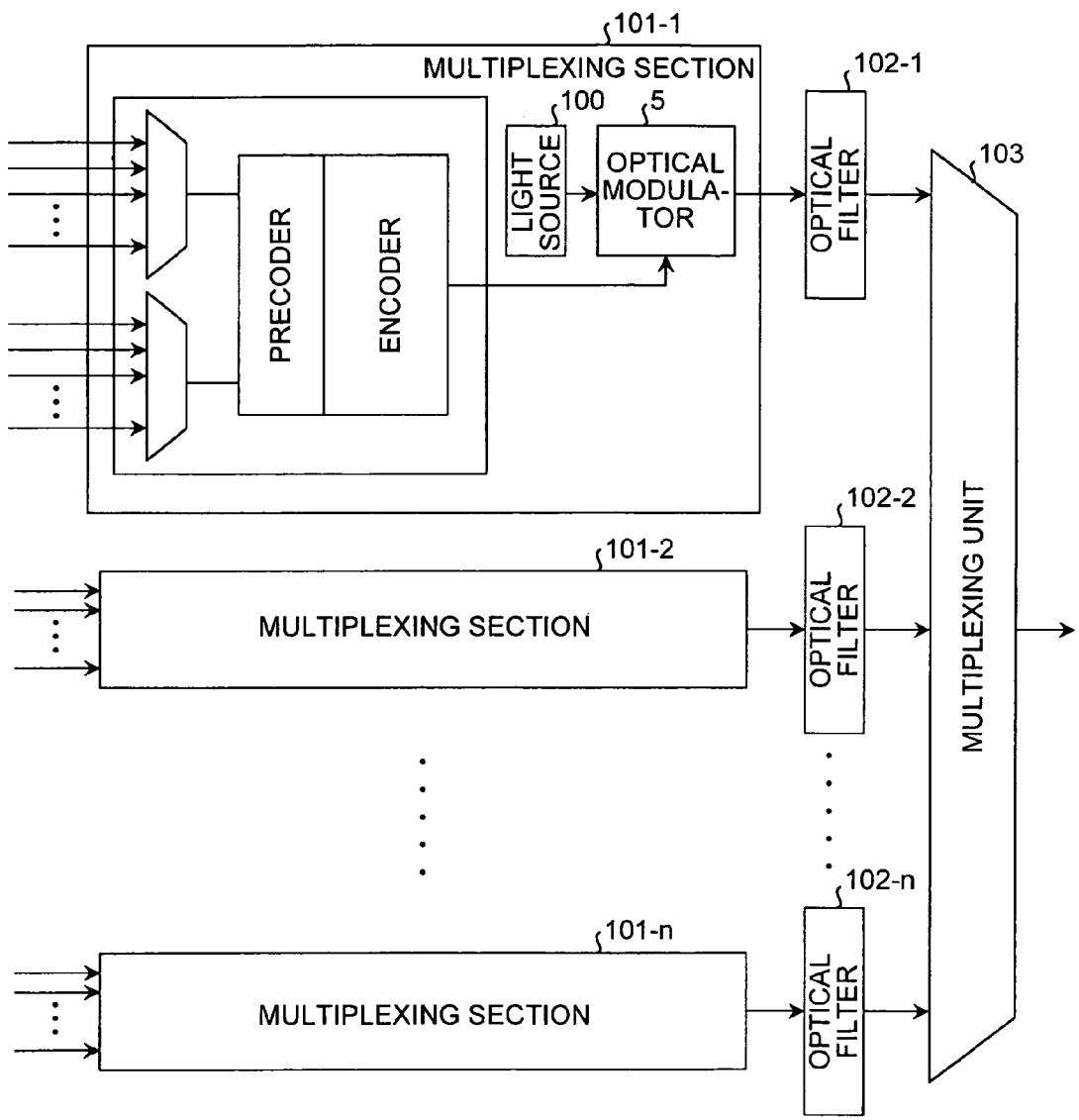
FIG. 15 shows the configuration of a multiplexer realizing wavelength multiplexing of a signal having the spectrum shown in FIG. 14.

FIG. 15 shows the configuration of a multiplexer that performs wavelength multiplexing using the CS-RZ modulation method. In FIG. 15, the multiplexing sections 101-1 to 101-n corresponding to the multiplexers in the first to the eighth embodiments respectively have a light source 100 as a pulse light source that emits light with the photocarrier frequency. The optical filters 102-1 to 102-n for the respective photocarrier frequencies are arranged at the subsequent stage of the respective multiplexing sections 101-1 to 101-n. The n optical signals output from the optical filters 102-1 to 102-n are input to a multiplexing device 103 and wavelength-division multiplexed, and the wavelength-division multiplexed lights are incident onto a single optical fiber.

Figure 16:
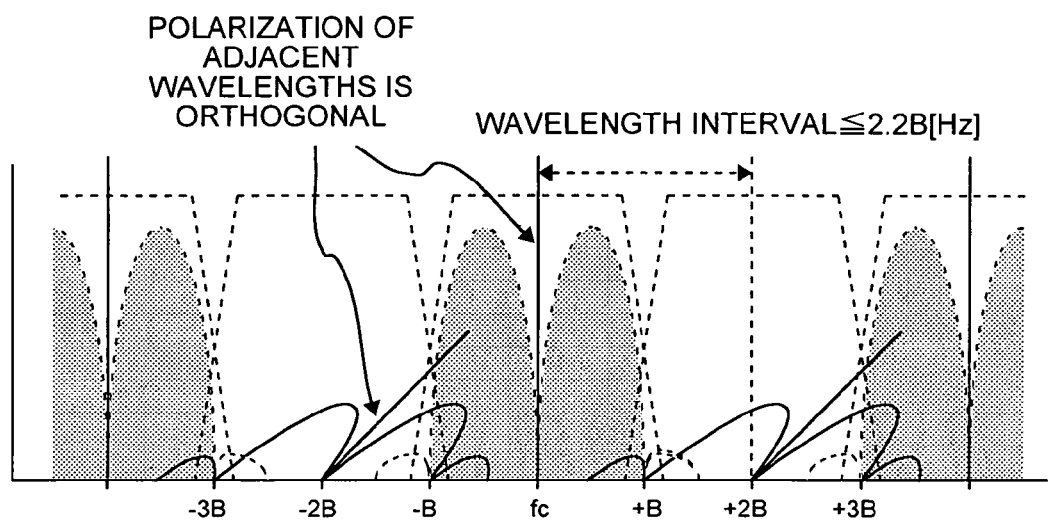
FIG. 16 is a diagram to explain multiplexing in which the adjacent wavelengths are made to be orthogonal to each other in the CS-RZ modulation method.

FIG. 16 shows spectrum of the lights each of which polarization is orthogonal to each other, when a duobinary signal is wavelength-division multiplexed by the CS-RZ modulation method. In FIG. 16, the adjacent wavelengths are orthogonal to each other. If the adjacent wavelengths are orthogonal to each other, the electric field is not directly added, and hence transmission penalty due to cross talk between wavelengths is considerably reduced. In this case, even if the wavelength interval is not larger than 2.3×B [Hz], there is no problem. If it is prepared for penalty more or less, for example, even when the wavelength interval d22 is brought close to about 1.6×B, signal transmission can be performed.

Figure 17:
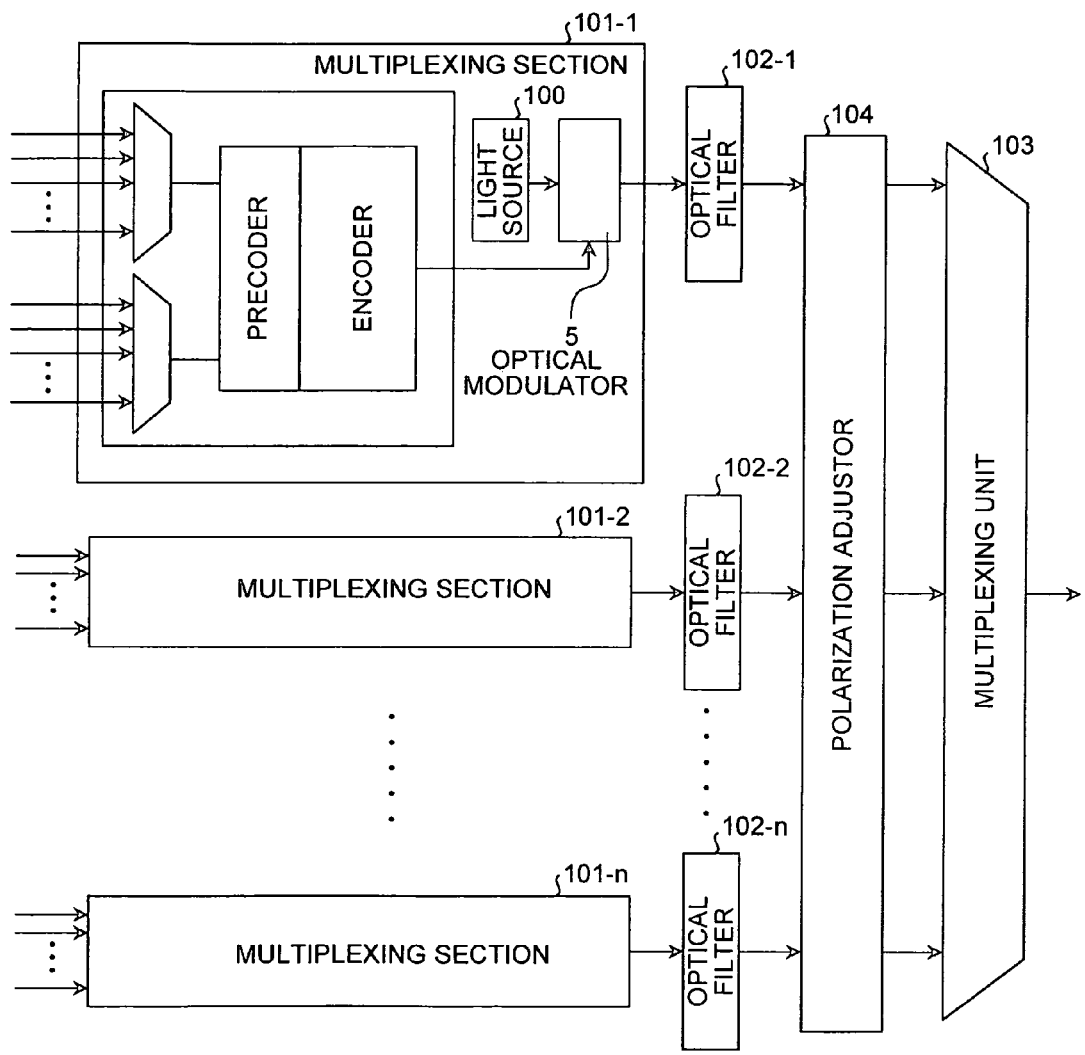
FIG. 17 shows the configuration of a multiplexer that can have the orthogonal relation shown in FIG. 16.
Figure 18:
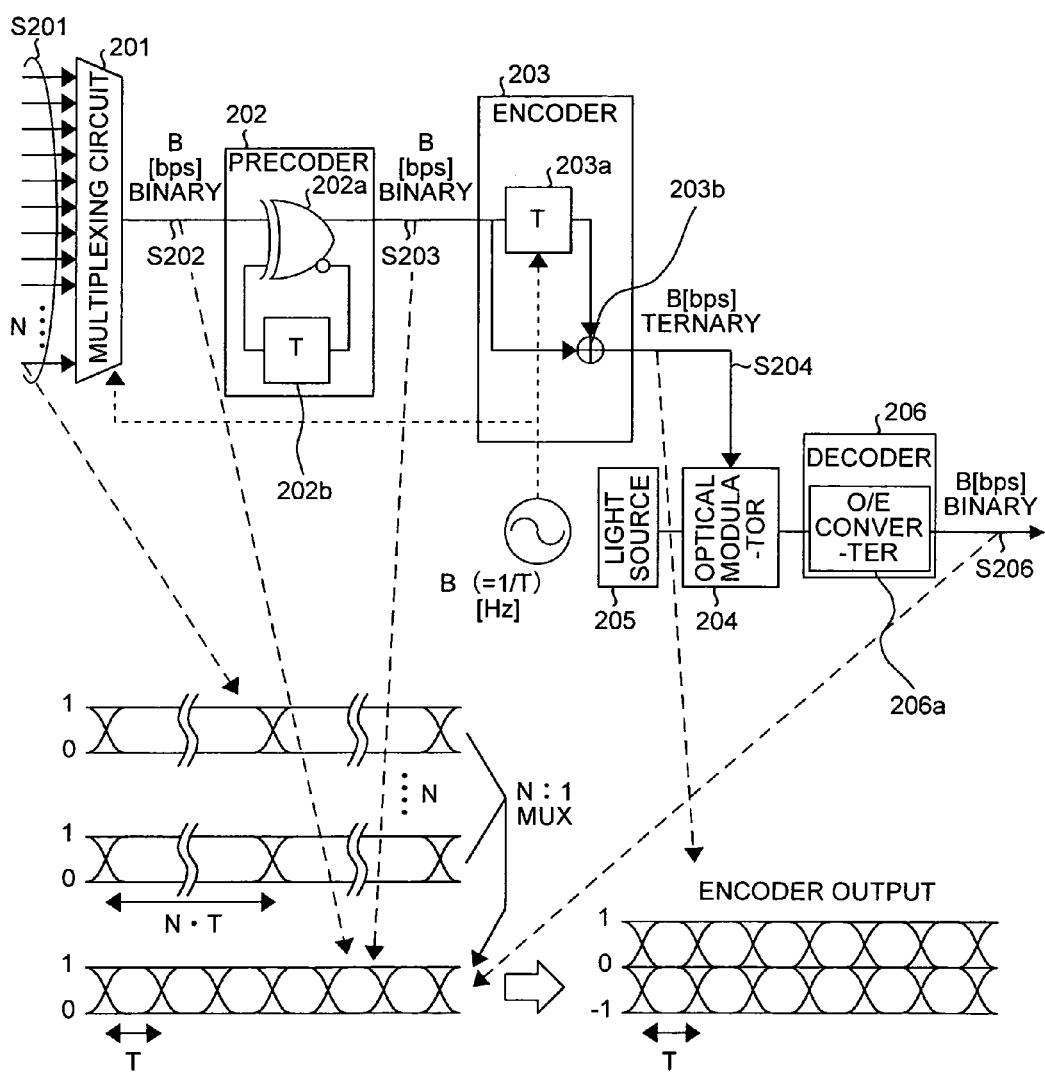
FIG. 18 shows the overall configuration of a conventional multiplexer.
Figure 19:
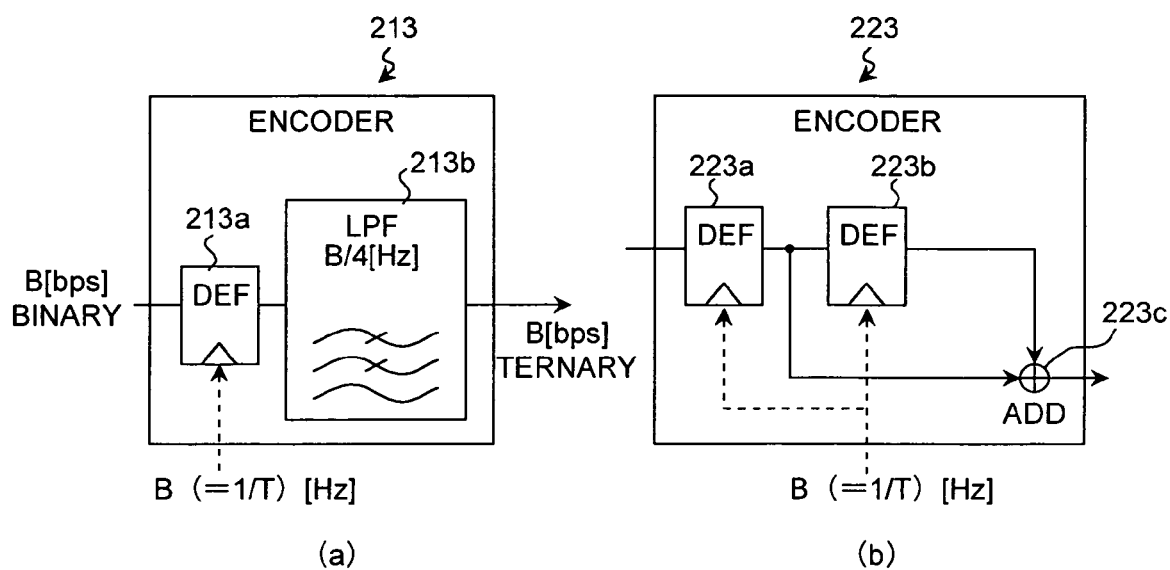
FIG. 19 is a circuit diagram that shows a specifically realized circuit of the encoder shown in FIG. 18.
Figure 20:
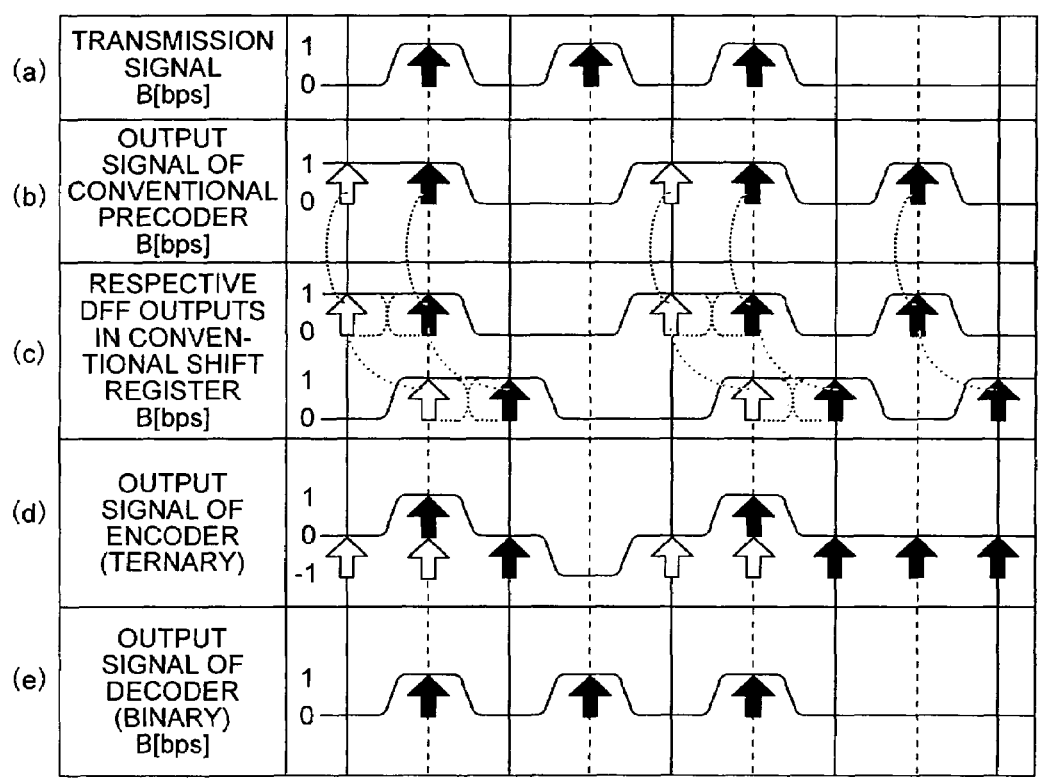
FIG. 20 is a timing chart that shows the signal waveform of each section in the multiplexer shown in FIG. 18.

FIG. 17 shows the configuration of a multiplexer that performs wavelength-division multiplexing by making the adjacent wavelengths orthogonal to each other. In FIG. 17, this multiplexer includes a polarization adjustor 104 that performs polarization adjustment for making the adjacent wavelengths orthogonal to each other, between the optical filters 102-1 to 102-n in the multiplexer shown in FIG. 15 and the multiplexing device 103. The other configuration is the same as that shown in FIG. 15, and the same constituents are denoted by the same reference characters. By this configuration, wavelength-division multiplexing in which adjacent wavelengths are orthogonal to each other is realized. The polarization adjustor 104 coordinates polarization to a reference plane of polarization and an orthogonal plane of polarization orthogonal to the reference plane of polarization for each wavelength to be adjusted, and polarization adjustment may be performed for each of the coordinated wavelength, and thereafter, multiplexing may be performed, or polarization adjustment may be performed for each wavelength.

In the tenth embodiment, the encoder output or the signal component of the optical duobinary signal can be realized, with the spectrum width same as in the conventional method by the CS-RZ (Carrier Suppressed-Return to Zero) modulation method, the degree of wavelength-division multiplexing by the CS-RZ modulation method can be doubled, and high-speed large capacity optical communication can be easily realized.

As explained above, according to this invention, the first and second flip-flop circuits output two signals having a transmission rate of half of the predetermined value at a frequency of half of the predetermined value, while holding the signals of the respective lines. The delay unit delays the output signal from the second flip-flop circuit by the time of the reciprocal of the predetermined value, as compared with the output signal output from the first flip-flop circuit, at the time of input timing of the addition unit. The addition unit adds the respective output signals output from the first and second flip-flop circuits and outputs the added signal. Therefore, the processing speed required for the electronic device such as the first and second flip-flop circuits constituting the encoder is reduced by half. Therefore, there is the effect that a low cost and small multiplexer can be realized.

According to the next invention, the first and the second amplification units respectively amplify the outputs signal from the first and the second flip-flop circuits. Therefore, there is the effect that the signal level of the ternary electric signal, being a modulating signal input to the modulator, can be maintained appropriately.

According to the next invention, the third amplification unit amplifies the output signal from the addition unit. Therefore, there is the effect that the number of amplification units can be reduced, and hence miniaturization can be further facilitated.

According to the next invention, the first and the second amplification units or the third amplification unit have a saturation characteristic such that the amplitude of the output signal is not amplified exceeding a certain level. Therefore, there is the effect that the signal can be output as a signal having an appropriate signal level.

According to the next invention, the delay unit is a transmission line arranged at the subsequent stage of the second flip-flop circuit, and having propagation delay. Therefore, there is the effect that reliable transmission delay can be obtained.

According to the next invention, the time delay unit in the delay unit is arranged at the previous stage of the second flip-flop circuit, and delays the output signal from the second flip-flop circuit by the time of the reciprocal of the predetermined value, as compared with the output signal output from the first flip-flop circuit, at the time of input timing of the addition unit. The phase shift unit shifts the clock timing of the second flip-flop circuit by 180 degrees. Therefore, there is the effect that the time delay unit can be provided externally, so that reliable delay can be set, and integration in other configuration can be facilitated.

According to the next invention, the optical modulator is formed of a Mach-Zehnder modulator, in which the optical splitter unit splits the input light, the optical phase modulation unit changes the phase of one of the optical signals split by the optical splitter by the ternary electric signal, and the coupler adds the optical signals split by the splitter. Therefore, there is the effect that even a Mach-Zehnder modulator having one optical phase modulating unit can generate an optical duobinary modulating signal by using a low-speed electronic device.

According to the next invention, the optical modulator is formed of a Mach-Zehnder modulator, in which the optical splitter bifurcates the input light, the first phase modulation unit changes the phase of one of the optical signals split by the optical splitter by the ternary electric signal, and the second phase modulation unit changes the phase of the other of the optical signals split by the optical splitter by the ternary electric signal. The coupler joins the optical signals split by the optical splitter. Therefore, there is the effect that even a Mach-Zehnder modulator having two optical phase modulating units can generate an optical duobinary modulating signal by using a low-speed electronic device.

According to the next invention, the first exclusive-OR gate circuit performs exclusive OR operation of one of the two signals having a transmission rate of ½ of the predetermined value and the output signal from the signal delay unit to output the result to the first flip-flop circuit and to the second exclusive-OR gate circuit, and the second exclusive-OR gate circuit performs exclusive OR operation of the other of the two signals having a transmission rate of ½ of the predetermined value and the output signal from the first exclusive-OR gate circuit to output the result to the second flip-flop circuit and to the signal delay unit, to thereby perform precoding for generating a ternary signal. Therefore, there is the effect that precode processing for generating a ternary electric signal can be performed by a low-speed electronic device.

According to the next invention, the precoder has N-parallel exclusive-OR gate circuits, to which N-parallel (N is a multiple of 2) low-speed signals are input, and performs preceding for generating the two signals having a transmission rate of half of the predetermined value, to be output to the encoder that generates the ternary electric signal. The first and the second multiplexing circuits multiplex the N-parallel signals output from the precoder to N/2:1, respectively, as two signals having a transmission rate of ½ of the predetermined value, and output the multiplexed signal to the encoder. In the precoder, the respective N-parallel exclusive-OR gate circuits corresponding to the N-parallel low-speed signals output the output from the exclusive-OR gate circuits to the first or second multiplexing circuit, corresponding to the parity of the-exclusive-OR gate circuits, and output it as an input of the next exclusive-OR gate circuit, and the last exclusive-OR gate circuit outputs the exclusive OR output delayed by the time N times the reciprocal of the predetermined value as an input of the first exclusive-OR gate circuit. Therefore, there is the effect that precode processing can be performed at a lower speed, thereby enabling high-speed processing, and reliable precode processing can be performed.

According to the next invention, when the optical band-pass filter wavelength-multiplexes the optical duobinary modulating signal obtained by modulating the DC light source in which the light intensity does not change timewise, the 2 dB transmission band of the optical band-pass filter is within a value of a center frequency of the modulated lights having the transmission rate of the predetermined value output from the optical modulator±0.6×predetermined value. Therefore, there is the effect that the number of multiplex can be increased.

According to the next invention, the light source is a pulse light source in which strong and weak light intensity is repeated at a cycle of the predetermined value. Therefore, there is the effect that stable optical transmission can be performed.

According to the next invention, the optical phase of the optical pulse output from the pulse light source is changed by 180 degrees for each pulse. Therefore, there is the effect that the CS-RZ modulation method can be realized, and even in this case, the band can be narrowed, and the number of wavelength multiplex can be increased.

According to the next invention, the optical band-pass filter has a configuration such that the 2 dB transmission band of the optical band-pass filter is within a value of a center frequency of the modulated lights having the transmission rate of the predetermined value output from the optical modulator±1.1×predetermined value, to thereby obtain a narrow band. Therefore, there is the effect that the number of wavelength multiplex can be increased.

According to the next invention, the multiplexing unit has the function of the optical band-pass filter, and outputs light as wavelength-multiplexed lights obtained by wavelength-multiplexing a plurality of modulated lights. Therefore, there is the effect that the number of wavelength multiplex can be increased at the time of wavelength multiplexing.

According to the next invention, the polarization adjusting unit is arranged at the previous stage of the multiplexing unit that makes the polarization of respective adjacent modulated lights orthogonal to each other, and the multiplexing unit outputs a plurality of modulated lights having a transmission rate of the predetermined value as wavelength-multiplexed lights. At this time, the wavelength interval between the adjacent modulated lights is set to 1.2 times or below of the predetermined value. Therefore, there is the effect that the number of wavelength multiplex can be increased.

According to the next invention, the polarization adjusting unit is arranged at the previous stage of the multiplexing unit that makes the polarization of respective adjacent modulated lights orthogonal to each other, and the multiplexing unit outputs a plurality of modulated lights having a transmission rate of the predetermined value as wavelength-multiplexed lights. At this time, the wavelength interval between the adjacent modulated lights is set to 2.3 times or below of the predetermined value. Therefore, there is the effect that even a pulse light source is used, the wavelength band can be narrowed, and the number of wavelength multiplex can be increased.

INDUSTRIAL APPLICABILITY

As explained above, the multiplexer according to the present invention is suitable for high-speed optical transmission using the duobinary modulation method.

The invention claimed is:
1. A multiplexer comprising:
a time-division multiplexing unit that multiplexes a plurality of digital signals into two signals each having a first transmission rate;
an encoder that generates a ternary electric signal from the two signals;
a light source; and
an optical modulator that modulates light, emitted from the light source, with the ternary electric signal, and transmits the light modulated as an optical signal having a second transmission rate twice the first transmission rate, wherein the encoder includes:

a first flip-flop circuit that holds one of the two signals at a frequency of the first transmission rate;

a second flip-flop circuit that holds the other of the two signals at the frequency;

a delay unit that delays a signal output from the second flip-flop circuit by a time of the reciprocal of the second transmission rate, with respect to a signal output from the first flip-flop circuit; and an adder that adds signals output from the first flip-flop circuit and delayed signals output form the delay unit, and transmits a resultant signal to the optical modulator.

2. The multiplexer according to claim 1, further comprising:

a first amplifier that amplifies the signal output from the first flip-flop circuit; and a second amplifier that amplifies the signal output from the second flip-flop circuit.

3. The multiplexer according to claim 2, wherein the first and the second amplifiers have a saturation characteristic in which amplitudes of signals output from the first and the second flip-flop circuits are not over a limit level.

4. The multiplexer according to claim 1, further comprising an amplifier that amplifies the resultant signal from the adder and transmits the signal amplified to the optical modulator.

5. The multiplexer according to claim 4, wherein the amplifier has a saturation characteristic in which the amplitude of the resultant signal from the adder is not over a limit level.

6. The multiplexer according to claim 1, wherein the delay unit is a signal wire that has a propagation delay and is arranged at the subsequent stage of the second flip-flop circuit.

7. The multiplexer according to claim 1, wherein the delay unit includes:

a signal delay unit that is arranged at the previous stage of the second flip-flop circuit, and delays the signal output from the second flip-flop circuit by the time of the reciprocal of the second transmission rate, with respect to a signal output from the first flip-flop circuit; and a phase shift unit that shifts a clock of the second flip-flop circuit by 180 degrees.

8. The multiplexer according to claim 1, wherein the optical modulator is a Mach-Zehnder modulator, and includes:

an optical splitter that splits the light emitted from the light source;

an optical phase modulation unit that shifts, by the ternary electric signal, the phase of one of the light split by the optical splitter; and a coupler that adds the other of the light split and the light shifted, and outputs a resultant light as the optical signal.

9. The multiplexer according to claim 1, wherein the optical modulator is a Mach-Zehnder modulator, and includes:

an optical splitter that splits the light emitted from the light source;

a first optical phase modulation unit that shifts, by the ternary electric signal, the phase of one of the light split by the optical splitter;

a second optical phase modulation unit that shifts, by the ternary electric signal, the phase of other of the light split; and a coupler that adds lights shifted, and outputs a resultant light as the optical signal.

10. The multiplexer according to claim 1, wherein the encoder includes a precoder having:

first and second exclusive-OR gates to which the two signals is input; and a signal delay unit that delays a signal output from the second exclusive-OR gate by twice the reciprocal of the second transmission rate, the first exclusive-OR gate performs exclusive OR operation of one of the two signals and a signal output from the signal delay unit, and transmits signal operated to the first flip-flop circuit, and the second exclusive-OR gate performs exclusive OR operation of other of the two signals and signal transmitted from the first exclusive-OR, and transmits signal operated to the second flip-flop circuit and to the signal delay unit.

11. The multiplexer according to claim 1, further comprising:

a precoder that have N-parallel exclusive-OR gates to which N-parallel signals are input respectively, and performs precoding for inputting the two signals to the encoder; and wherein the time-division multiplexing unit divides the N-parallel signals into two N/2-parallel signals, multiplexes the two N/2-parallel signals into the two signals respectively, and outputs the two signals to the encoder, wherein N−1 of the N-parallel exclusive-OR gates receive output of one of an adjacent exclusive-OR gate, other of the N-parallel exclusive-OR gates receives a signal that delayed by N times the reciprocal of the second transmission rate with respect to a signal output from one of the (N−1)-parallel exclusive-OR gates.

12. The multiplexer according to claim 1, further comprising: an optical band-pass filter that passes a optical signal in a band which is output from the optical modulator, wherein the light source is a direct-current light source in which the light intensity does not change timewise, and the 2 dB pass band of the optical band-pass filter is within $fc \pm 0.6 \times B$, where fc is a center frequency of the optical signal, and B is the second transmission rate.

13. The multiplexer according to claim 12, further comprising a coupler that has the function of the optical band-pass filter, and wavelength-division multiplexes a plurality of modulated optical signals.

14. The multiplexer according to claim 1, wherein the light source is a pulse light source in which strong and weak light intensity of the light source is repeated at a cycle of the second transmission rate.

15. The multiplexer according to claim 14, further comprising:

a coupler that wavelength-division multiplexes a plurality of modulated lights having the second transmission rate; and a polarization adjusting unit that makes the polarization of respective adjacent modulated lights orthogonal to each other, and outputs the light polarized to the coupler, wherein the wavelength interval between the adjacent modulated lights is set to 2.3 times or below of the second transmission rate.

16. The multiplexer according to claim 14, further comprising: an optical band-pass filter that passes a optical signal in a band which is output from the optical modulator, the 2 dB pass band of the optical band-pass filter is within $fc \pm 1.1 \times B$, where fc is a center frequency of the optical signal, and B is the second transmission rate.

17. The multiplexer according to claim 16, further comprising:
a coupler that wavelength-division multiplexes a plurality of modulated lights having the second transmission rate; and
a polarization adjusting unit that makes the polarization of respective adjacent modulated lights orthogonal to each other, and outputs the light polarized to the coupler,
wherein the wavelength interval between the adjacent modulated lights is set to 2.3 times or below of the second transmission rate.

18. The multiplexer according to claim 15, wherein the optical phase of the optical pulse output from the pulse light source changes by 180 degrees for each pulse.

19. The multiplexer according to claim 18, further comprising:
a coupler that wavelength-division multiplexes a plurality of modulated lights having the second transmission rate; and
a polarization adjusting unit that makes the polarization of respective adjacent modulated lights orthogonal to each other, and outputs the light polarized to the coupler,
wherein the wavelength interval between the adjacent modulated lights is set to 2.3 times or below of the second transmission rate.

20. The multiplexer according to claim 18, further comprising: an optical band-pass filter that passes a optical signal in a band which is output from the optical modulator, the 2 dB pass band of the optical band-pass filter is within $fc \pm 1.1 \times B$, where fc is a center frequency of the optical signal, and B is the second transmission rate.

21. The multiplexer according to claim 20, further comprising:
a coupler that wavelength-division multiplexes a plurality of modulated lights having the second transmission rate; and
a polarization adjusting unit that makes the polarization of respective adjacent modulated lights orthogonal to each other, and outputs the light polarized to the coupler,
wherein the wavelength interval between the adjacent modulated lights is set to 2.3 times or below of the second transmission rate.

22. The multiplexer according to claim 20, further comprising a coupler that has the function of an optical band-pass filter, and wavelength-division multiplexes a plurality of modulated optical signals.

23. The multiplexer according to claim 20, further comprising:
a coupler that wavelength-division multiplexes a plurality of modulated lights having the second transmission rate; and
a polarization adjusting unit that makes the polarization of respective adjacent modulated lights orthogonal to each other, and outputs the light polarized to the coupler,
wherein the wavelength interval between the adjacent modulated lights is set to 1.2 times or below of the second transmission rate.

* * * * *